United States Patent
Hasegawa et al.

(10) Patent No.: US 12,314,616 B2
(45) Date of Patent: May 27, 2025

(54) PRINTING SYSTEM, TERMINAL APPARATUS, AND STORAGE MEDIUM

(71) Applicant: CANON KABUSHIKI KAISHA, Tokyo (JP)

(72) Inventors: Kiichi Hasegawa, Ibaraki (JP); Hikaru Sugita, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/520,353

(22) Filed: Nov. 27, 2023

(65) Prior Publication Data

US 2024/0176564 A1   May 30, 2024

(30) Foreign Application Priority Data

Nov. 28, 2022 (JP) ................ 2022-188908

(51) Int. Cl.
*G06F 3/12* (2006.01)
*G06T 11/60* (2006.01)

(52) U.S. Cl.
CPC .......... *G06F 3/1256* (2013.01); *G06F 3/1208* (2013.01); *G06F 3/1285* (2013.01); *G06T 11/60* (2013.01); *G06F 3/1204* (2013.01)

(58) Field of Classification Search
None
See application file for complete search history.

(56) References Cited

U.S. PATENT DOCUMENTS

2011/0312278 A1* 12/2011 Matsushita ............ H04W 4/80
455/66.1
2013/0147687 A1* 6/2013 Small ...................... G06F 3/015
345/8

FOREIGN PATENT DOCUMENTS

JP        2020181593 A     11/2020

* cited by examiner

*Primary Examiner* — Darryl V Dottin
(74) *Attorney, Agent, or Firm* — Canon U.S.A., Inc. IP Division

(57) ABSTRACT

A printing system includes a reception unit configured to receive a print setting from a user, a generation unit configured to generate a virtual object based on the received print setting and print target image data, a display unit configured to display the generated virtual object in a superimposed manner on a video image obtained by image capturing, and a control unit configured to transmit the print setting and the print target image data to a printing apparatus and cause the printing apparatus to perform printing based on the print setting and the print target image data. The display unit displays the virtual object in actual size based on the video image and sheet size information included in the print setting.

9 Claims, 19 Drawing Sheets

PRINTING SYSTEM, TERMINAL APPARATUS, AND STORAGE MEDIUM

BACKGROUND

Field of the Disclosure

The present disclosure relates to a printing system, a terminal apparatus, and a storage medium.

Description of the Related Art

Japanese Patent Application No. 2020-181593 discusses a technique for displaying a print data preview image on a display unit of an image forming apparatus to check a print target image before printing.

As discussed in Japanese Patent Application No. 2020-181593, in the case of displaying a preview image on a display unit of an image forming apparatus or a display unit of an information processing apparatus, such as a personal computer (PC), to check a print target image before printing, the image is not displayed in the actual size of the image after printing. In some cases, a user may wish to adjust print settings based on the environment in which an output product obtained by printing the image is to be used. For example, in the case of displaying a print product on a wall, the user may wish to check whether the size of characters and objects in the image is appropriate and adjust print settings if necessary. In such a case, with the technique discussed in Japanese Patent Application No. 2020-181593, it is necessary for the user to actually print the image and bring the resulting output product to the environment, which may result in a waste of sheets.

SUMMARY

Embodiments of the present disclosure are directed to reducing a waste of sheets in a case where a user checks a product to be output based on print settings designated by the user.

According to embodiments of the present disclosure, a printing system includes a reception unit configured to receive a print setting from a user, a generation unit configured to generate a virtual object based on the received print setting and print target image data, a display unit configured to display the generated virtual object in a superimposed manner on a video image obtained by image capturing, and a control unit configured to transmit the print setting and the print target image data to a printing apparatus and cause the printing apparatus to perform printing based on the print setting and the print target image data. The display unit displays the virtual object in actual size based on the video image and sheet size information included in the print setting.

Further features of the present disclosure will become apparent from the following description of exemplary embodiments with reference to the attached drawings.

DESCRIPTION OF THE EMBODIMENTS

Exemplary embodiments of the present disclosure will be described in detail below with reference to the drawings. The following exemplary embodiments are not intended to limit the disclosure. Further, not all combinations of features described in the exemplary embodiments are essential to the solution of the present disclosure.

Figure 1:
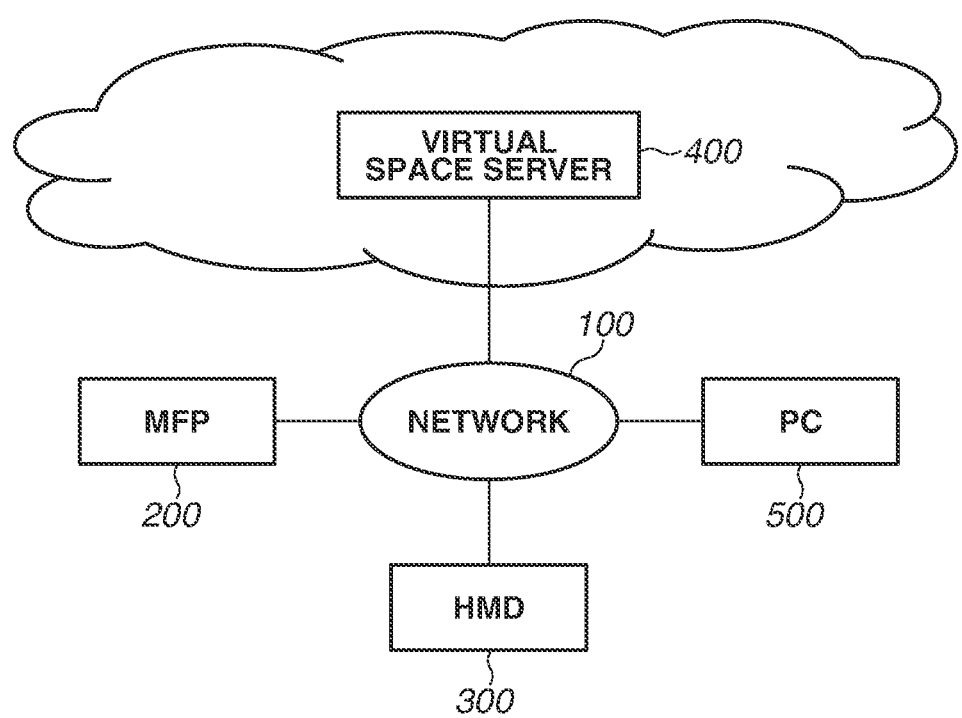
FIG. 1 is a diagram illustrating a configuration example of a printing system.

FIG. 1 illustrates a configuration example of a printing system according to a first exemplary embodiment of the present disclosure. In the printing system illustrated in FIG. 1, a virtual space server 400, which is an information processing apparatus, and a multifunction peripheral (MFP) 200, which is an image processing apparatus or a printing apparatus, are connected via a network 100. In the printing system, a head-mounted display (HMD) 300, which is a terminal apparatus or a display apparatus, and a personal computer (PC) 500, which is a terminal apparatus or an information processing apparatus, are also connected via the network 100. The PC 500 may be, for example, a game console. The virtual space server 400 provides a virtual space based on a virtual reality (VR) technique. The virtual space server 400 renders an object to be displayed in the virtual space, manages users participating in the virtual space, and manages content. The HMD 300 is a display to be worn by a user. While the HMD 300 is used in the present exemplary embodiment, the present exemplary embodiment is not limited thereto, and a goggle-type display, a glasses-type display, or a contact-lenses-type display may be used instead. The user operates the PC 500 or the HMD 300 so that the virtual space server 400 registers and authenticates user information. The network 100 may be the Internet to which the MFP 200 and the virtual space server 400 are connected or may be an intra-company network such as an intranet. For example, the PC 500 and the HMD 300 are connected via a wireless local area network (LAN) or the Internet to transmit and receive information such as print settings and image data. This configuration enables a user to transmit and receive setting information even when the apparatus (the PC 500) used to make print settings is distant from the user. For example, even when the wall on which the user plans to display an output product is distant from the PC 500, the user can approach the wall to check whether the size and color of the output product are appropriate. The HMD 300 and the MFP 200 may also be connected via the Internet or a wireless LAN.

The HMD 300 accesses the virtual space server 400 to obtain a stereoscopic virtual space including a three-dimensional (3D) object generated by the virtual space server 400 and displays the obtained virtual space so that the user wearing the HMD 300 can recognize the virtual space. The 3D object in the virtual space displayed by the HMD 300 may be rendered by the virtual space server 400 or may be rendered by the HMD 300. In a case where the HMD 300 generates a virtual object, the HMD 300 receives print target image data and print settings from the PC 500, generates a virtual object based on the received print settings and image data, and displays the generated virtual object. If the HMD 300 is connected to the virtual space server 400 via the PC 500, the PC 500 may render the object.

The HMD 300 is connected to the PC 500 on which a print preview application is installed, so that the HMD 300 can display an object corresponding to a print product in a superimposed manner on a video image captured by a camera 305 (see FIG. 3) of the HMD 300. In the present exemplary embodiment, the HMD 300 is connected to the PC 500, but instead this processing may be implemented by the virtual space server 400.

Figure 2:
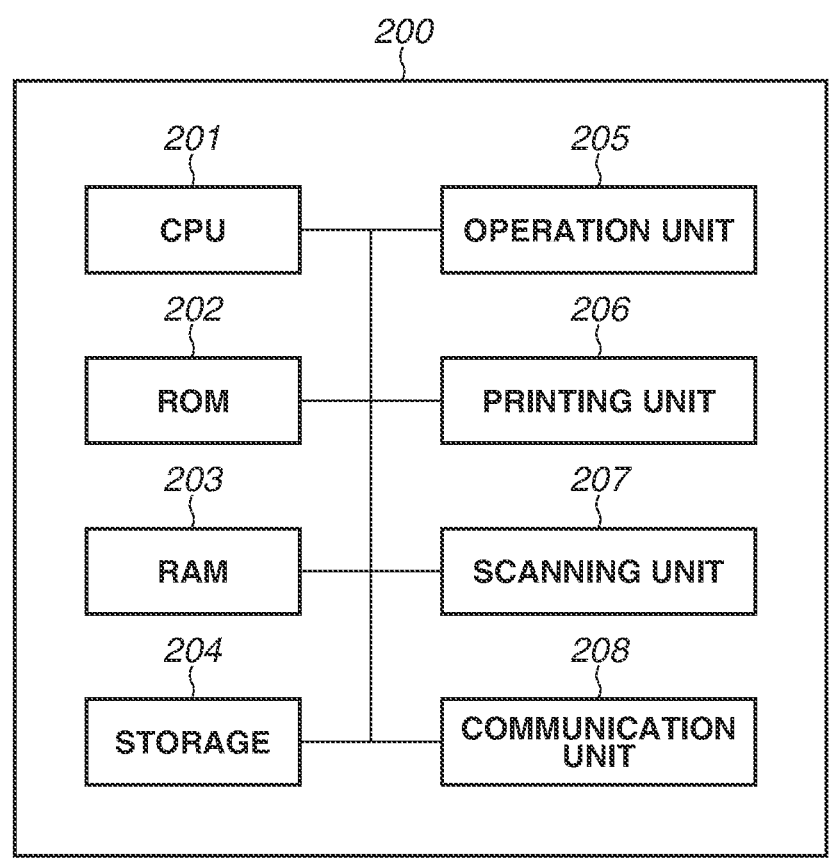
FIG. 2 is a block diagram illustrating a hardware configuration example of a multifunction peripheral (MFP).

FIG. 2 is a block diagram illustrating a hardware configuration example of the MFP 200. The MFP 200, which is an example of an image processing apparatus, includes a central processing unit (CPU) 201, a read-only memory (ROM) 202, a random-access memory (RAM) 203, a storage 204, an operation unit 205, a printing unit 206, a scanning unit 207, and a communication unit 208. The MFP 200 may be a printing apparatus having only a printing function. The CPU 201 controls the entire operation of the MFP 200. The CPU 201 loads control programs stored in the ROM 202 or the storage 204 into the RAM 203 and performs various kinds of control processing such as scanning control and printing control. The ROM 202 stores control programs executable by the CPU 201. The RAM 203 is a main storage memory and is used as a work area and a temporary storage area for loading various control programs stored in the ROM 202 and the storage 204. The storage 204 stores image data, print data, various programs, and various kinds of setting information. In the present exemplary embodiment, a flash memory is assumed to be used as the storage 204. Alternatively, an auxiliary storage device such as a solid-state drive (SSD) or a hard disc drive (HDD) may be used. An embedded Multi Media Card (eMMC) may also be used. In the MFP 200 according to the present exemplary embodiment, one CPU 201 uses one RAM 203 to perform each processing in flowcharts to be described below. However, the present exemplary embodiment is not limited thereto. For example, each processing in the flowcharts to be described below may be performed by using a plurality of CPUs, RAMs, ROMs, and storages in cooperation.

A part of the processing may be performed using a hardware circuit such as an application-specific integrated circuit (ASIC) or a field programmable gate array (FPGA).

The operation unit 205 includes a display unit, such as a touch panel, and hardware keys. The operation unit 205 displays information for the user and receives input from the user.

The printing unit 206 prints an image on a recording sheet fed from a sheet feed cassette, based on image data (print data) stored in the RAM 203. The scanning unit 207 scans an image on a document to generate image data. The image data generated based on the image scanned by the scanning unit 207 is transmitted to an external apparatus or is printed on a recording sheet by the printing unit 206. The scanning unit 207 scans a document placed on a platen glass (not illustrated) using a sensor, such as a contact image sensor (CIS), to generate image data. The scanning unit 207 also includes an auto document feeder (ADF) (not illustrated) that conveys one or more document sheets placed on a document tray and scans the image(s) on the conveyed sheet(s) using a sensor, such as a CIS, thereby generating image data. In the case of using the ADF to scan images on a plurality of document sheets, the user inputs a single scan instruction. When the MFP 200 receives the scan instruction, the scanning unit 207 can convey the plurality of document sheets and scan the images on the conveyed sheets. In the case of scanning two document sheets, two pieces of image data (two files) may be generated, or one file including two pages may be generated.

The communication unit 208 is a network interface (I/F) for connection to the network 100. The communication unit 208 transmits image data to an external apparatus on the network 100 and also receives print data from a terminal apparatus. Examples of the method for transmitting and receiving data via the network 100 include transmission and reception using an electronic mail, and file transmission using other protocols (e.g., a file transfer protocol (FTP), Server Message Block (SMB), and Web-based Distributed Authoring and Versioning (WebDAV)). Image data and various kinds of setting data can also be transmitted and received via the network 100 by access from the PC 500 via HyperText Transfer Protocol (HTTP) communication.

Figure 3:
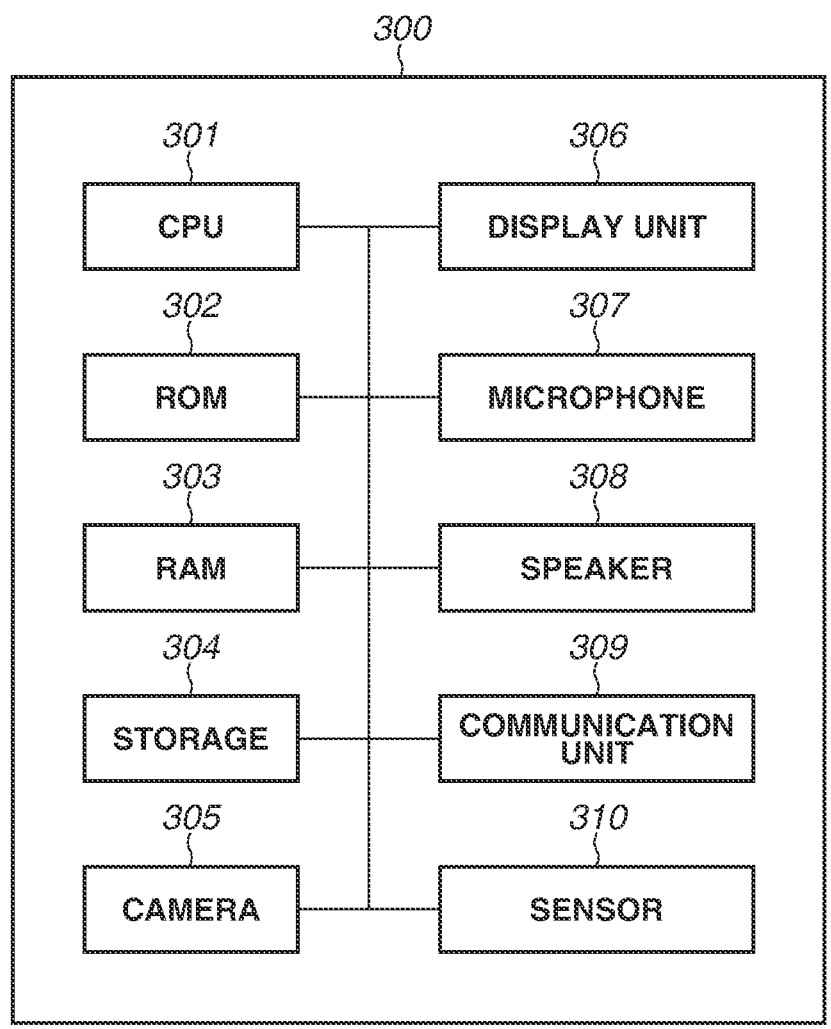
FIG. 3 is a block diagram illustrating a hardware configuration example of a head-mounted display (HMD).

FIG. 3 is a block diagram illustrating a hardware configuration example of the HMD 300. The HMD 300 includes a CPU 301, a ROM 302, a RAM 303, a storage 304, the camera 305, a display unit 306, a microphone 307, a speaker 308, a communication unit 309, and a sensor 310. The CPU 301 controls the entire operation of the HMD 300. The CPU 301 loads control programs stored in the ROM 302 or the storage 304 into the RAM 303 and performs various kinds of processing for controlling the operation of the HMD 300. The ROM 302 stores control programs executable by the CPU 301. The RAM 303 is a main storage memory and is used as a work area and a temporary storage area for loading various control programs stored in the ROM 302 and the storage 304. The storage 304 stores application data, various programs, and various kinds of setting information. In the present exemplary embodiment, a flash memory is assumed to be used as the storage 304. Alternatively, an auxiliary storage device such as an SSD or an HDD may be used. The camera 305 is an image capturing apparatus that obtains image data by capturing an image of a surrounding environment using an image sensor that converts light into an electric signal.

The display unit 306 is a display device including a liquid crystal panel. The display unit 306 also includes a lens for correcting distortion of a video image displayed on the liquid crystal panel. The user views the liquid crystal panel through the lens, so that the user can view a video image or an image without distortion. One or more liquid crystal panels may be included in the display unit 306.

The display unit 306 displays video image data or image data processed by the CPU 301 and displays video image data or image data input via the camera 305.

The microphone 307 converts sound into audio data, and the speaker 308 outputs the audio data, and audio signals processed by the CPU 301.

The communication unit 309 transmits and receives data to and from the virtual space server 400, the PC 500, and the MFP 200 via the network 100. The sensor 310 is a group of sensors including a position sensor and an acceleration sensor. Based on a signal value obtained by the sensor 310, the video image or image displayed on the display unit 306 is switched. For example, in a case where the user wearing the HMD 300 accesses a certain virtual space, when the user turns the face to the left, the video image or image displayed on the display unit 306 is switched. In other words, the video image or image is displayed at another angle based on the user's viewpoint.

The display unit 306 is configured to display a video image captured by the camera 305 and display a virtual object in a superimposed manner on the video image. A display position of the virtual object to be displayed can be designated via a controller (not illustrated) connected to the HMD 300. The configuration illustrated in FIG. 3 is merely an example and may not necessarily include all the components described above.

Figure 4:
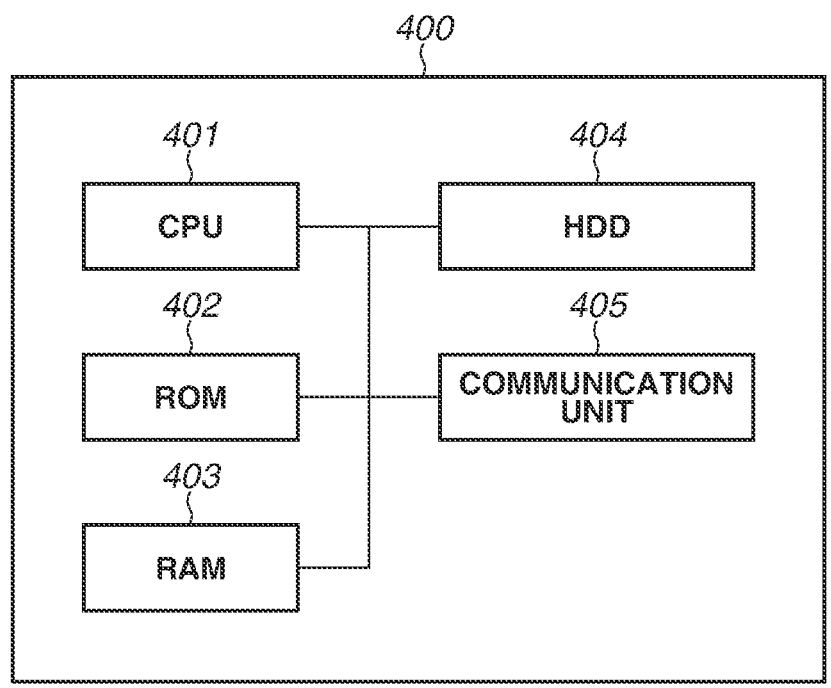
FIG. 4 is a block diagram illustrating a hardware configuration example of a virtual space server.

FIG. 4 is a block diagram illustrating a hardware configuration example of the virtual space server 400. A CPU 401 includes an arithmetic circuit. The CPU 401 loads programs stored in a ROM 402 or an HDD 404 into a RAM 403 and performs various kinds of processing. The ROM 402 stores system programs used for control of user management and content management processed by the virtual space server 400. The virtual space server 400 provides services (e.g., an online meeting service, a chat service, and a social networking site (SNS) service) for sharing information in a virtual space using a VR technique or an augmented reality (AR) technique. In the services, a virtual space is provided for each user or each group. The HDD 404 functions as a storage area and stores application programs for performing various kinds of processing. The HDD 404 is an example of a storage device. Instead of the HDD 404, an SSD or the like may be used. A communication unit 405 is an interface for connecting various apparatuses to applications. The communication unit 405 communicates with the PC 500, the HMD 300, the MFP 200, and the like via the network 100 under control of the CPU 401. The HDD 404 stores applications for providing services for a plurality of users to exchange information in the virtual space based on the VR technique or the AR technique. Client applications for the services are stored in the storage 304 of the HMD 300, the storage 204 of the MFP 200, and a storage device of the PC 500.

Figure 5:
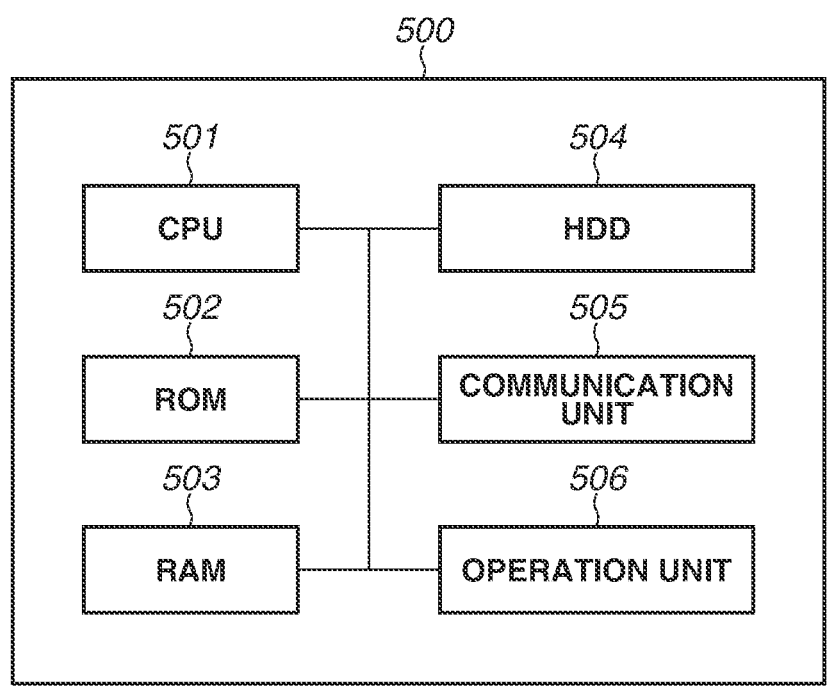
FIG. 5 is a block diagram illustrating a hardware configuration example of a personal computer (PC).

FIG. 5 is a block diagram illustrating a hardware configuration example of the PC 500. The PC 500 includes a CPU 501, a ROM 502, a RAM 503, an HDD 504, a communication unit 505, and an operation unit 506. The CPU 501 controls the entire operation of the PC 500. The CPU 501 loads control programs stored in the ROM 502 or the HDD 504 into the RAM 503 and performs various kinds of processing for controlling the operation of the PC 500. The ROM 502 stores control programs executable by the CPU 501. The RAM 503 is a main storage memory and is used as a work area and a temporary storage area for loading various control programs stored in the ROM 502 and the HDD 504. The HDD 504 stores application data, various programs, and various kinds of setting information. The communication unit 505 transmits and receives data to and from the virtual space server 400, the HMD 300, and the MFP 200 via the network 100. The operation unit 506 includes a display unit, such as a touch panel, and hardware keys. The operation unit 506 displays information for the user and receives input from the user.

An AR print preview application (hereinafter referred to as an AR print preview app) is installed on the HDD 504 and runs on the CPU 501.

Figure 6:
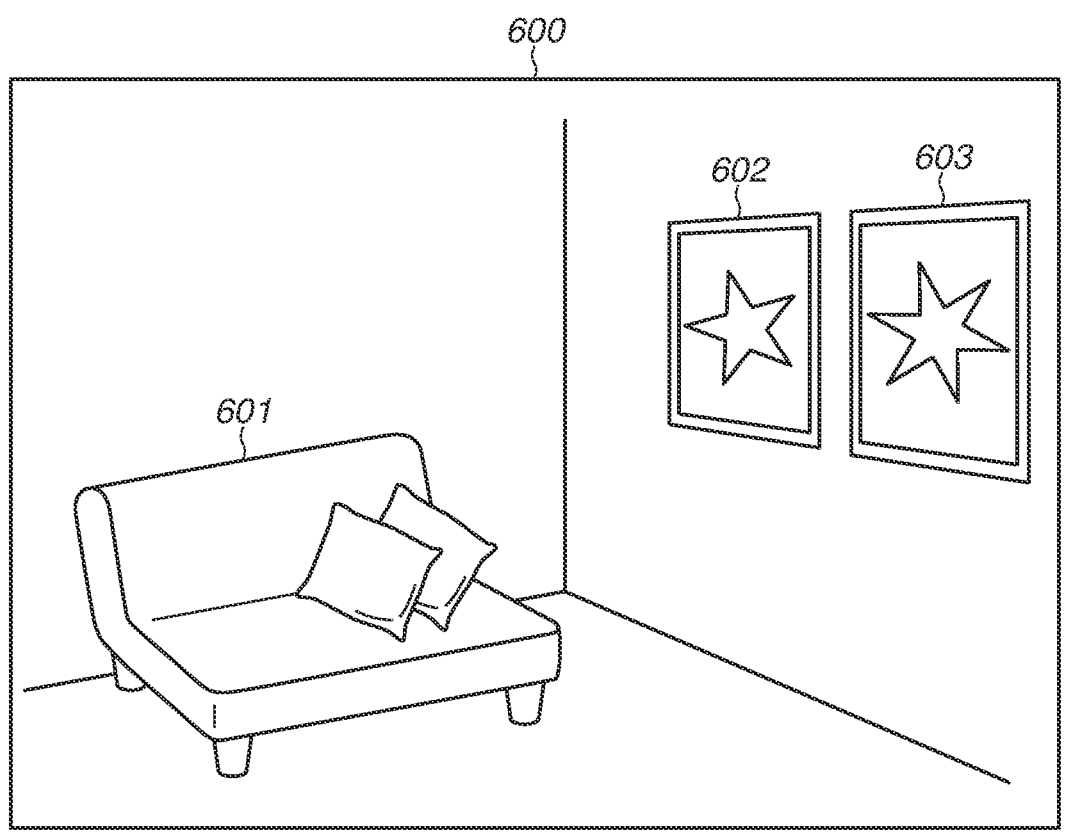
FIG. 6 is a diagram illustrating an example of an augmented reality (AR) space.

FIG. 6 illustrates an AR space 600 according to the present exemplary embodiment. The user wearing the HMD 300 can recognize the AR space 600 by viewing the video image displayed on the display unit 306. The video image captured by the camera 305 is displayed on the display unit 306, and a virtual object can be displayed in a superimposed manner on the video image. Physical objects 601 to 603 (a sofa 601 and paintings 602 and 603) are present in the space actually captured by the camera 305, and the physical objects 601 to 603 are displayed in the AR space 600. In this manner, physical objects present in the real space and virtual objects can be displayed on the same screen, so that the real space can be extended. Not only virtual objects, but also operation objects for receiving input from the user can be displayed.

The size of each displayed virtual object is adjusted so that the virtual object can be displayed in actual size based on distance information indicating the distance from the user wearing the HMD 300. Accordingly, the display is adjusted so that the size of each virtual object increases as the user approaches the virtual object and decreases as the user moves away from the virtual object. The distance information may be calculated based on positional information of the HMD 300 or may be calculated based on the video image obtained by image capturing by the camera 305 of the HMD 300. As a result, the virtual object is displayed in actual size.

The display position of the virtual object is fixed at a position designated by the user. Accordingly, if the user turns the face in a direction in which the position designated by the user is not captured by the camera 305, the virtual object is not displayed. If the user turns the face again in a direction in which the position designated by the user is captured by the camera 305, the virtual object is displayed again. In other words, the displayed virtual object does not move along with the user's movement. The display angle of the virtual object is not constantly set to be right in front of the user. The virtual object can be viewed obliquely or can be viewed from the back side.

Figure 7:
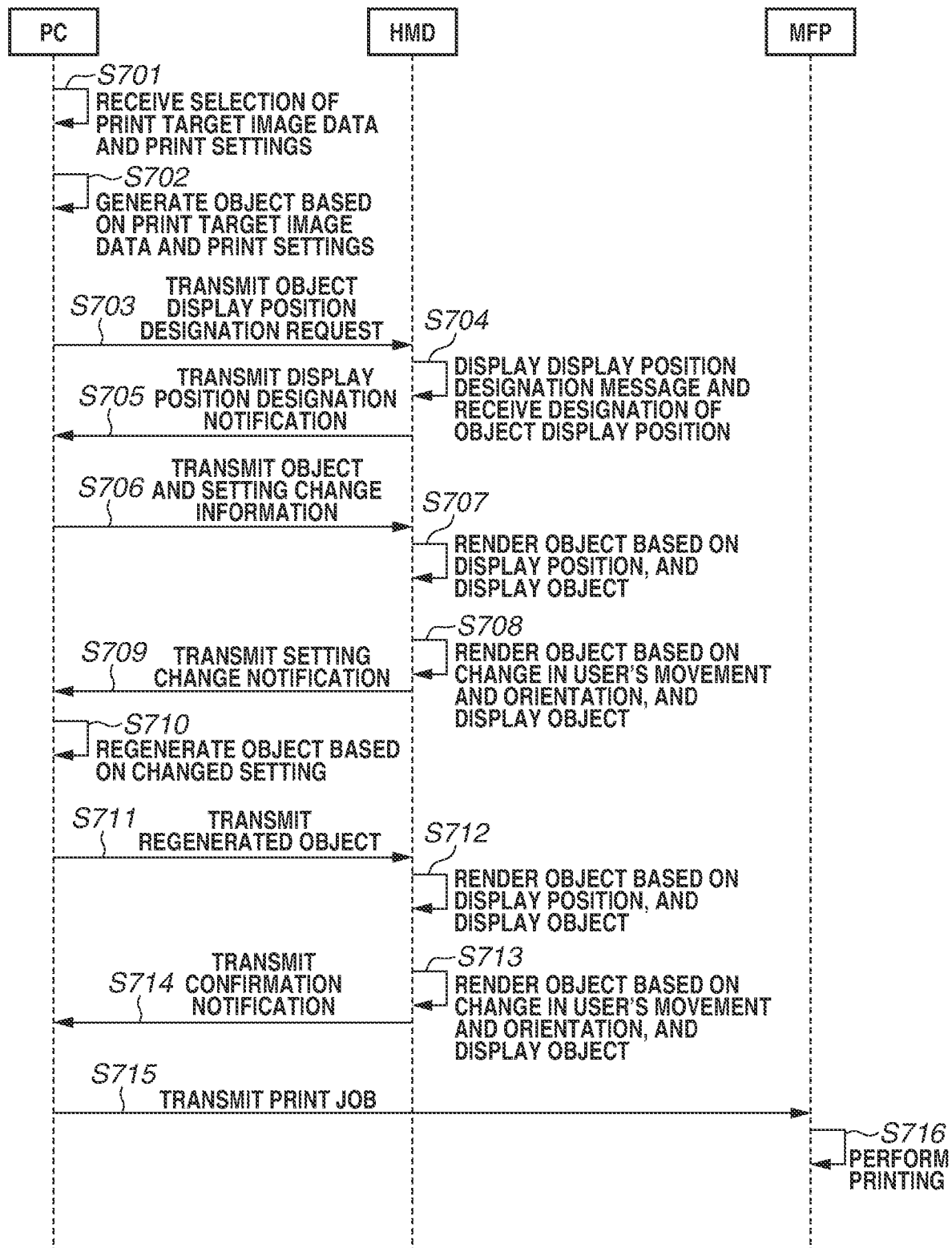
FIG. 7 is a sequence diagram illustrating an example of AR print preview processing.

FIG. 7 is a sequence diagram illustrating an example of AR print preview processing. In step S701, the user starts the AR print preview app installed on the PC 500 and selects print target image data and makes print settings. The MFP 200 that performs print processing is registered in the AR print preview app. Information about the registered MFP 200 may be stored in the HDD 504 of the PC 500 or may be stored in a server connected to the PC 500. In a case where the information is stored in a predetermined server, when the CPU 501 of the PC 500 executes the AR print preview app, the AR print preview app inquires about the information about the MFP 200 registered in the predetermined server. In other words, in the processing of step S701, the operation unit 506 of the PC 500 serves as a reception unit and receives the print settings and the selection of print target image data. The processing of the reception unit may be performed by the HMD 300.

The AR print preview app also obtains capability information indicating capabilities of the registered MFP 200 from the registered MFP 200. The capability information includes information about print settings that can be made on the MFP 200, such as supported sheet sizes, two-sided printing and single-sided printing, color printing and monochrome printing, and post-processing settings including stapling and folding. The capability information also includes print setting information indicating a layout setting, such as N-in-1, and a printing orientation. For example, the capability information indicating that A4 and A3 size sheets are supported, double-sided printing and single-sided printing are supported, color printing and monochrome printing are supported, stapling is supported, Z-fold is supported, 2-in-1, 4-in-1, and 8-in-1 are supported, portrait printing and landscape printing are supported may be obtained from the MFP 200.

The AR print preview app then displays a print settings screen (not illustrated) based on the capability information obtained from the MFP 200. The user can make the print settings described above on the print settings screen.

In step S702, the CPU 501 of the PC 500 generates an object to be displayed in the AR space 600, based on the print target image data selected by the user in step S701 and the print settings made by the user in step S701. For example, if an A3-size sheet, single-sided printing, color printing, 1-in-1, portrait printing, no stapling, and no Z-fold are set on the print settings screen, the object is generated based on these settings. Since the A3-size sheet is selected, the generated object is displayed in the virtual space (the AR space 600) so that the user can recognize the object of A3 size (297×420 mm). More specifically, when the user wears the HMD 300 and the generated object is displayed on the display unit 306, the generated object is displayed in the actual size of the A3-size sheet. Further, the object in which the color/monochrome setting and the layout setting are reflected is displayed. This enables generating the object based on the 1-in-1 setting and displaying the object in actual size, so that the user can check whether the size of the characters and images is appropriate without printing, which can save sheets.

In step S703, the CPU 501 of the PC 500 transmits, to the HMD 300, a request to designate a display position of the object generated in step S702

In step S704, the CPU 301 of the HMD 300 uses the display unit 306 to display, in the AR space 600, a message for prompting the user to designate the display position, and a position designation object 1002 (see FIG. 10) for designating the display position. Using the controller connected to the HMD 300, the user designates the position where the object is to be displayed in the AR space 600. The user may designate the position by inputting three-dimensional coordinates, or the HMD 300 may designate the position by recognizing the user's hand and hand sign via the camera 305. The CPU 301 stores positional information (coordinate information) indicating the designated position into the RAM 303. Examples of the positional information stored at this time include a combination of coordinate information about the upper-left vertex of the object and the vertical and horizontal lengths (and depth), and coordinate information about the upper-left and lower-right vertices of the object. In other words, in the processing of step S704, the HMD 300 serves as a position reception unit and receives designation of the position where the virtual object is to be displayed. The processing of the position reception unit may be performed by the PC 500.

In step S705, the CPU 301 of the HMD 300 notifies the PC 500 that the display position has been designated.

Figure 11:
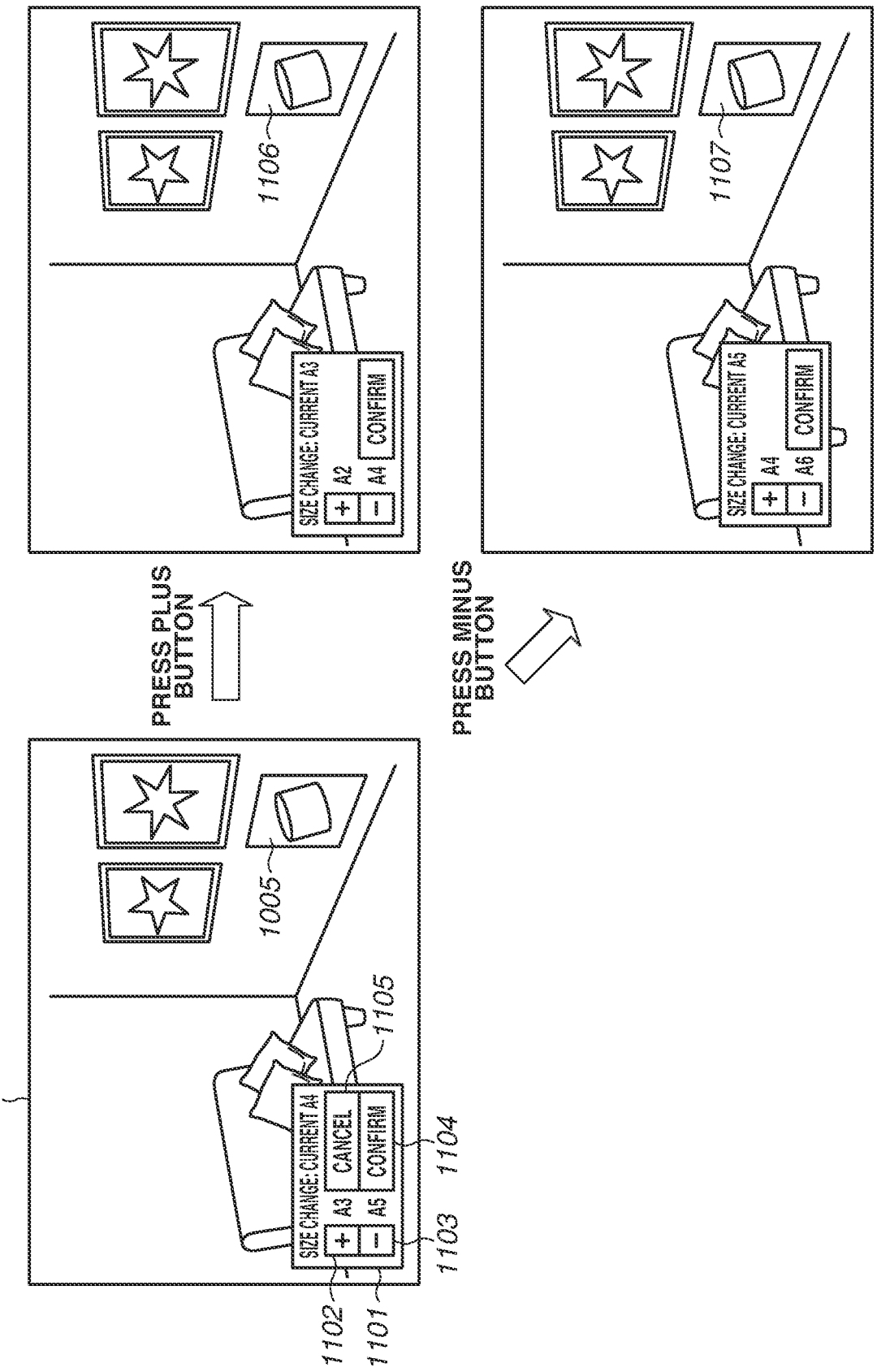
FIG. 11 is a diagram illustrating an example of how the screen changes in a case where a print setting change is made in the AR space.

In step S706, the CPU 501 of the PC 500 transmits, to the HMD 300, the generated object and setting change information for use in object setting change to be described below with reference to FIG. 11. The setting change information transmitted at this time is information to be used to make a print setting change in the AR space 600, and candidate print settings are transmitted based on the capability information obtained in step S701. As a result, settings similar to the settings that can be made on the print settings screen in step S701 can be made in the AR space 600.

In step S707, the CPU 301 of the HMD 300 renders the object received from the PC 500, based on the display position designated by the user in step S704. The position designation object 1002 is displayed in an AR space 1001 (see FIG. 10).

After that, the object is displayed at the designated position. The CPU 301 further displays a setting change object 1101 (see FIG. 11) for receiving a print setting change.

The video image displayed on the HMD 300 in the processing from the object display position designation in step S704 to the object display in step S707 will now be described with reference to FIG. 10.

Figure 10:
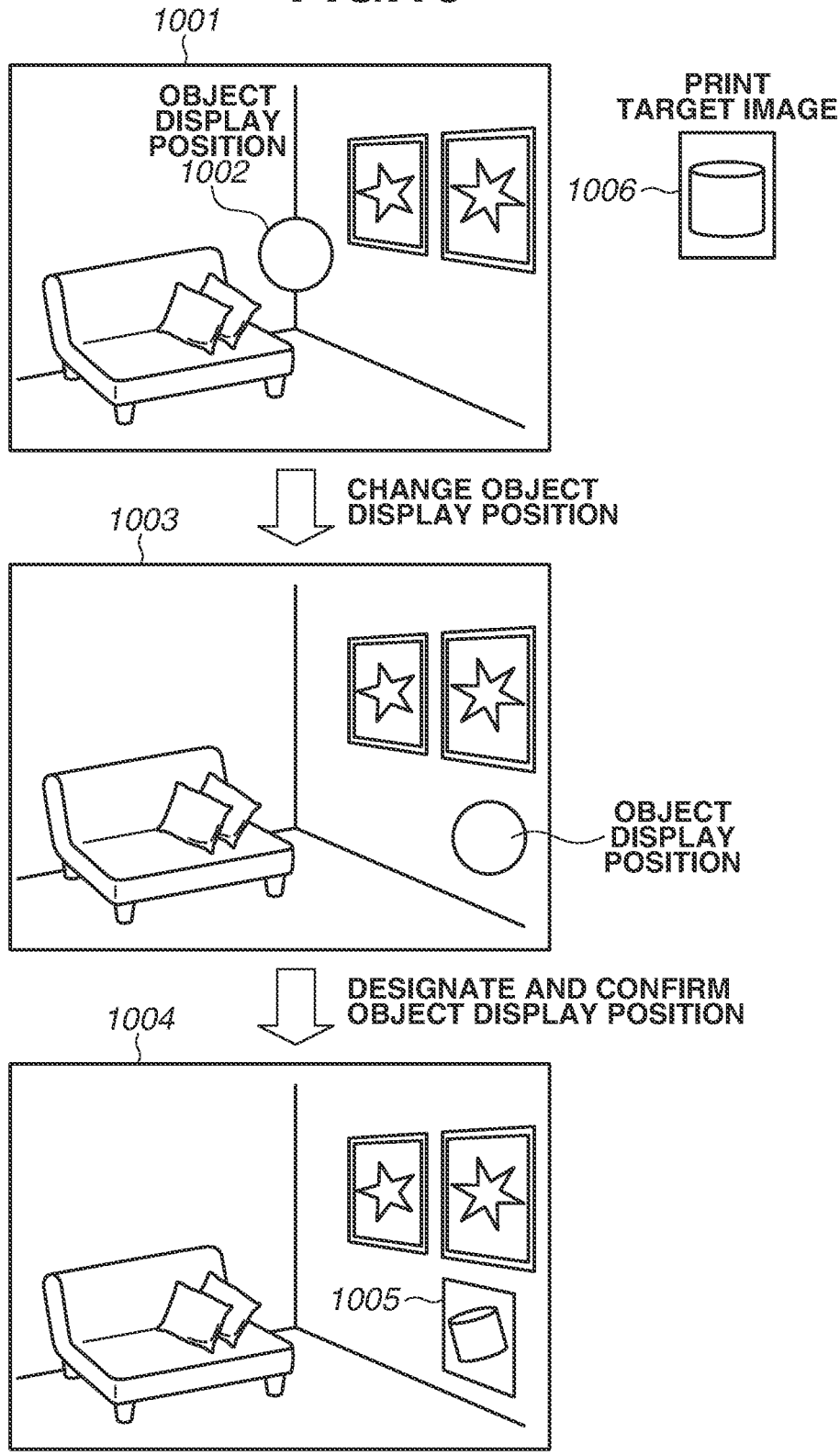
FIG. 10 is a diagram illustrating an example of how a screen changes in a case where a position of an object is designated and the object is displayed in an AR space.

FIG. 10 illustrates an example of how the screen changes in a case where the position of an object 1005 is designated and the object 1005 is displayed in the AR space 1001.

The AR space 1001 is displayed on the display unit 306. When the HMD 300 receives an object display position designation request from the PC 500, the position designation object 1002 is displayed. The user wearing the HMD 300 operates the position designation object 1002 to move the position designation object 1002 to a desired position. An AR space 1003 is displayed after the user moves the position designation object 1002.

An AR space 1004 is displayed after the user operates the position designation object 1002 and confirms the designation of the position. In the AR space 1004, the object 1005 generated by the AR print preview app based on a print target image 1006 is displayed at the designated position. As described above, at this time, the object 1005 is displayed in a state where the size, layout, color, and the like are adjusted based on the print settings made via the AR print preview app. The object 1005 also includes an image of the image data selected as the print target image data in step S701.

Referring again to FIG. 7, in step S708, the CPU 301 of the HMD 300 displays the object 1005 while changing the size of the object 1005 and adjusting the angle of the object 1005 based on a change in the user's movement and orientation.

In step S709, when a setting change is made by the user using the setting change object 1101, the CPU 301 of the HMD 300 notifies the PC 500 of the setting change. The setting change notification is transmitted based on the setting made using the setting change object 1101. For example, when a size change button 1102 (see FIG. 11) is pressed, the notification that the size is set to be one size larger is transmitted, and when a size change button 1103 (see FIG. 11) is pressed, the notification that the size is set to be one size smaller is transmitted. The term "one size" used herein is determined based on the capability information about the MFP 200. For example, in a case where the MFP 200 supports A3-, A4-, and A5-size sheets, when the sheet size is set to be one size larger than A4, the sheet size is changed to A3, and when the sheet size is set to be one size smaller than A4, the sheet size is changed to A5.

In step S710, the CPU 501 of the PC 500 regenerates the object based on the setting change notification transmitted in step S709. For example, "setting the sheet size to be one size larger" means that the sheet size is changed to the sheet size that is the second largest to the current size among the sheet sizes supported by the MFP 200, and "setting the sheet size to be one size smaller" means that the sheet size is changed to the sheet size that is the second smallest to the current size among the sheet sizes supported by the MFP 200. In step S710, the setting change made in step S709 is stored into the RAM 203.

In step S711, the CPU 501 of the PC 500 transmits the regenerated object to the HMD 300.

In step S712, the CPU 301 of the HMD 300 renders the object received from the PC 500, based on the display position designated by the user. The object is then displayed at the designated position based on the positional information stored in the RAM 303. More specifically, the virtual object is displayed based on the video image obtained by image capturing by the camera 305 and the designated position.

The video image displayed on the HMD 300 in the processing from the operation of the setting change object 1101 in step S709 to the object display in step S712 after the setting change will now be described with reference to FIG. 11. FIG. 11 illustrates an example of how the screen changes in a case where a print setting change is made in an AR space 1100.

The AR space 1100 is displayed on the display unit 306. Upon receiving the setting change object 1101 from the PC 500, the HMD 300 displays the setting change object 1101 for receiving a setting change instruction from the user in a state where the virtual object (the object 1005) is displayed. On the setting change object 1101, the current print setting, the size change button 1102, and the size change button 1103 are displayed. A confirm button 1104 for confirming the setting to perform printing and a cancel button 1105 for canceling printing are also displayed. While in the present exemplary embodiment, changing the sheet size is described as an example of changing a print setting, the present exemplary embodiment is not limited thereto. Any print settings can be changed in step S709 as long as the print settings can be made in step S701. For example, the layout setting, such as N-in-1, color/monochrome setting, and post-processing settings described above can be made in step S701 and can be changed in step S709.

When the size change button 1102 is selected, the size of the object 1005 displayed in A4 size is changed, so that an object 1106 of A3 size is displayed. When the size change button 1103 is selected, the size of the object 1005 displayed in A4 size is changed, so that an object 1107 of A5 size is displayed. As described above, not only when the sheet size is changed, but also when other print settings are changed, the appearance of the displayed object changes based on the setting change(s).

If the confirm button 1104 is selected, the image data selected in step S701 is printed based on the print settings applied to the object being displayed at the timing when the confirm button 1104 is selected.

The sheet size of the object to be displayed is selected from among the sheet sizes that are supported by the MFP 200 and are obtained in step S701, and the object is displayed in the selected size. In the present exemplary embodiment, the sheet size is changed based on the sheet sizes supported by the MFP 200, but instead may be changed in units of length such as centimeters (cm).

In step S713, the CPU 301 of the HMD 300 displays the object while adjusting the angle of the object based on a change in the user's movement and orientation.

In step S714, the CPU 301 of the HMD 300 notifies the PC 500 that the confirm button 1104 has been pressed.

In step S715, the CPU 501 of the PC 500 generates a print job based on the print settings stored in the RAM 203 and the image data selected in step S701 and transmits the generated print job to the MFP 200. While in the present exemplary embodiment, an example where a print job is transmitted from the PC 500 to the MFP 200 is described, the present exemplary embodiment is not limited thereto. For example, the HMD 300 may directly transmit a print job to the MFP 200, or the HMD 300 may transmit a print request to a cloud server connected thereto via the Internet and the cloud server may transmit a print job to the MFP 200. In this manner, in a state where a virtual object is displayed, a button for issuing a print instruction is displayed in a selectable manner, thereby enabling the user to easily issue a print instruction while checking a preview of a product to be output. This saves the user time and labor.

In step S716, the CPU 201 of the MFP 200 causes the printing unit 206 to print an image on a sheet based on the image data and print setting information included in the received print job.

In the present exemplary embodiment, the HMD 300 renders the object based on the user's movement. Alternatively, the PC 500 may render the object and the HMD 300 may display the object.

While in the present exemplary embodiment, an example where the PC 500 receives the print settings is described, the HMD 300 may receive the print settings directly. In this case, the HMD 300 obtains image data from the PC 500 and receives print settings for the image data on a print settings screen displayed on the display unit 306.

In some embodiments, the image data generated by the scanning unit 207 of the MFP 200 scanning an image on a document and the print settings received on the operation unit 205 of the MFP 200 may be transmitted to the HMD 300. Then, the HMD 300 may generate a virtual object based on the image data and the print settings and display the generated virtual object in a superimposed manner on a video image captured by the camera 305. Upon receiving a print setting change in the AR space, the HMD 300 may regenerate and redisplay the virtual object. Further, upon receiving a print instruction in the AR space, the HMD 300 may transmit the print setting change and the print instruction to the MFP 200, and the printing unit 206 of the MFP 200 may print an image on a sheet based on the print setting change and the image data. This configuration enables a preview of copy output by the MFP 200 to be displayed in the AR space. In this case, the virtual object is displayed in the AR space in a manner similar to that described above.

Figure 8:
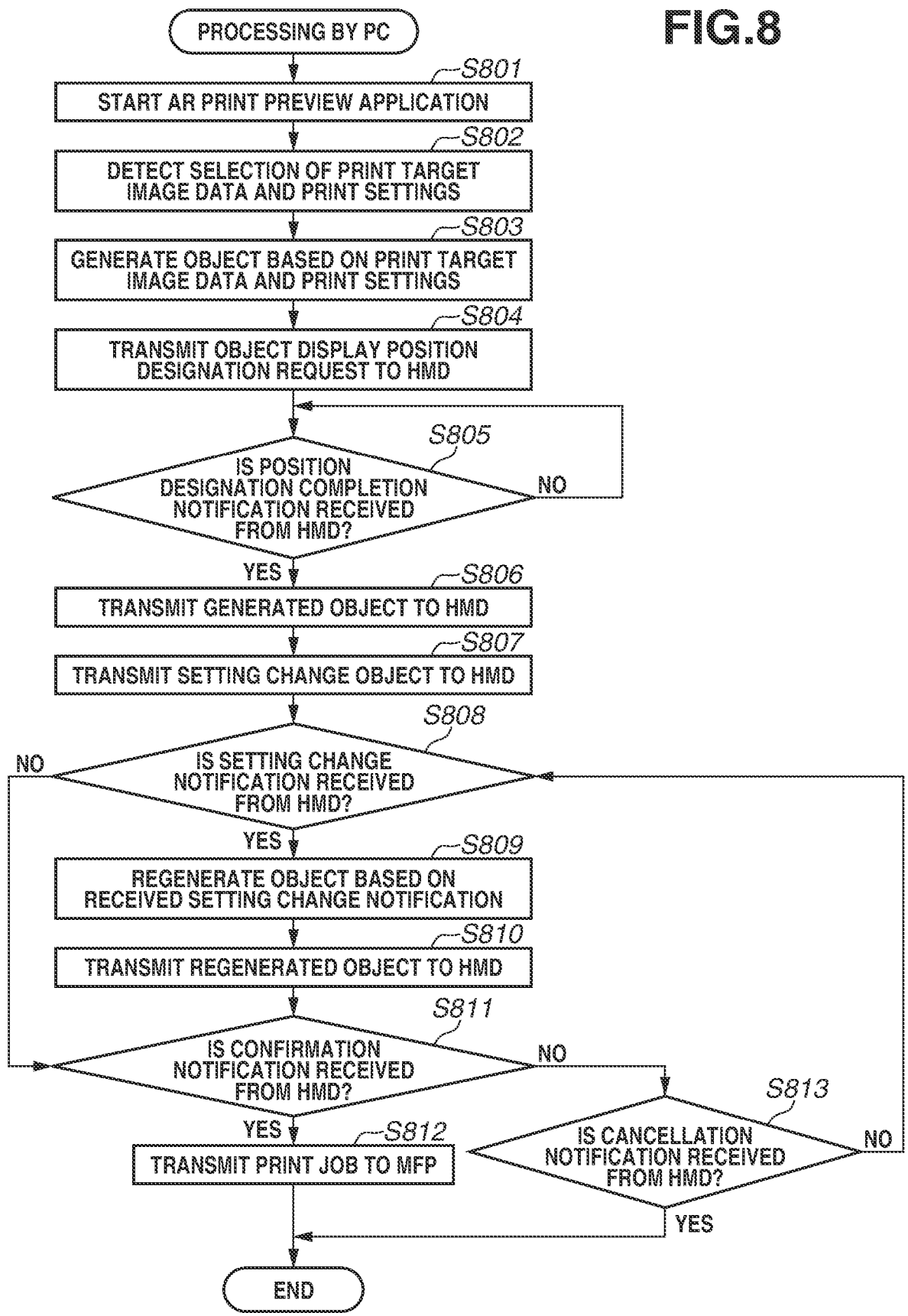
FIG. 8 is a flowchart illustrating an example of processing performed by the PC in an AR print preview function.

FIG. 8 is a flowchart illustrating an example of processing performed by the PC 500 in an AR print preview function. Each operation (step) of the PC 500 in the flowchart according to the present exemplary embodiment is implemented by the CPU 501 loading the AR print preview app stored in the ROM 502 or the HDD 504 into the RAM 503 and executing the AR print preview app.

In step S801, the CPU 501 starts the AR print preview app upon receiving a request to start the AR print preview app from the user. When the AR print preview app is started, a screen (not illustrated) for selecting print target image data and making print settings is displayed.

In step S802, the CPU 501 detects the selection of print target image data and the print settings, which are performed by the user via the AR print preview application.

In step S803, the CPU 501 generates an object to be displayed in the AR space 600, based on the image data selected by the user and the print settings.

In step S804, the CPU 501 transmits an object display position designation request to the HMD 300.

In step S805, the CPU 501 determines whether a notification that the designation of the display position of the object is completed is received from the HMD 300. If the position designation completion notification is received from the HMD 300 (YES in step S805), the processing proceeds to step S806.

In step S806, the CPU 501 transmits the generated object to the HMD 300. In step S807, the CPU 501 transmits the setting change object 1101 to the HMD 300. In step S808, the CPU 501 determines whether a setting change notification is received from the HMD 300. If a setting change notification is not received from the HMD 300 (NO in step S808), the processing proceeds to step S811. If a setting change notification is received from the HMD 300 (YES in step S808), the processing proceeds to step S809.

In step S809, the CPU 501 regenerates the object based on the setting change notification received in step S808. In step S810, the CPU 501 transmits the regenerated object to the HMD 300.

In step S811, the CPU 501 determines whether a confirmation notification is received from the HMD 300. If a confirmation notification is received from the HMD 300 (YES in step S811), the processing proceeds to step S812. If a confirmation notification is not received from the HMD 300 (NO in step S811), the processing proceeds to step S813.

In step S812, the CPU 501 transmits a print job including the print setting for the confirmed size to the MFP 200. In step S813, the CPU 501 determines whether a cancellation notification is received from the HMD 300. If a cancellation notification is not received from the HMD 300 (NO in step S813), the processing returns to step S808. If a cancellation notification is received from the HMD 300 (YES in step S813), the processing is terminated.

Figure 9:
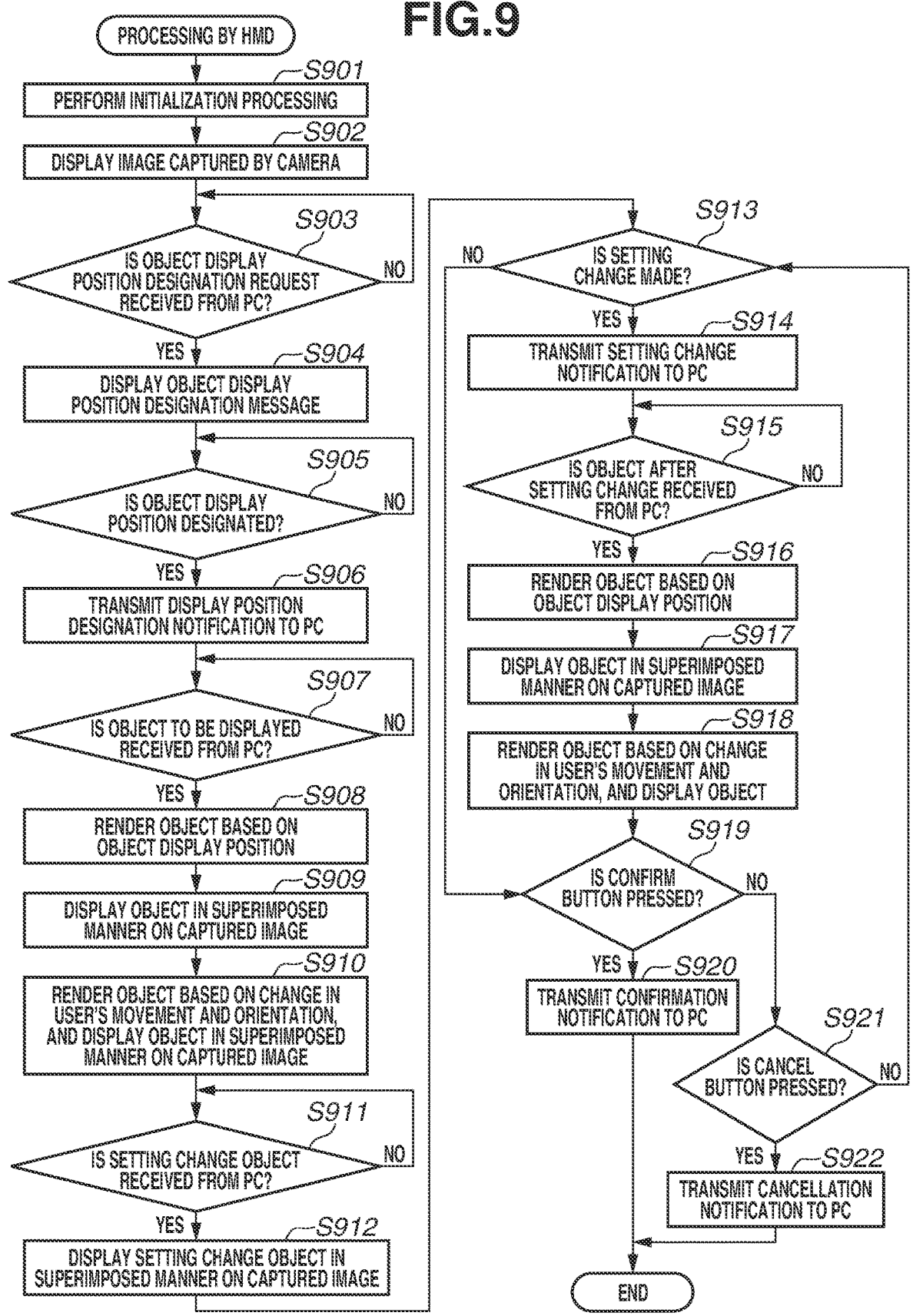
FIG. 9 is a flowchart illustrating an example of processing performed by the HMD in a case where an AR print preview is performed.

FIG. 9 is a flowchart illustrating processing performed by the HMD 300 during the AR print preview processing. Each operation (step) of the HMD 300 in the flowchart according to the present exemplary embodiment is implemented by the CPU 301 loading control programs stored in the ROM 302 or the storage 304 into the RAM 303 and executing the control programs.

In step S901, the CPU 301 performs initialization processing. Examples of the initialization processing include initializing numerical value information used to measure a distance to a target object, for example, by setting the viewpoint of the user wearing the HMD 300 to a "0" point of an X-axis, a Y-axis, and a Z-axis. The AR space described in the present exemplary embodiment is a space recognition type AR space in which the HMD 300 preliminarily recognizes the surrounding environment (e.g., a wall, a floor, etc.) using the camera 305 and identifies the size (including a height, a horizontal length, and a depth) of the surrounding space. Coordinate positions are initialized based on the identified size of the space. For example, a certain vertex of the identified space is set to a reference point (0, 0, 0) of three-dimensional coordinates. This makes it possible to determine the coordinates of the object based on the reference point. Further, the HMD 300 identifies the position of the HMD 300 in the three-dimensional coordinates, thereby making it possible to identify the distance between the object and the HMD 300 (the user) and to enlarge or reduce the displayed object based on the distance. With this configuration, the object to be displayed can be displayed based on the actual sense of perspective. While in the present exemplary embodiment, an example where the sense of perspective of the object is managed based on coordinates is described, the present exemplary embodiment is not limited thereto. For example, the sizes of physical objects (e.g., a wall, a floor, and a sofa) imaged by the camera 305 and the distances to the physical objects are stored during the initialization. Then, an increase or decrease in the size of each physical object imaged by the camera 305 due to the movement of the HMD 300 may be recognized and the movement distance may be calculated based on the change in the size of each physical object. Then, the display of the object may be enlarged or reduced based on the calculated movement distance. In other words, the virtual object is displayed in actual size based on the video image obtained by image capturing by the camera 305 of the HMD 300 and the sheet size information set as a print setting.

In step S902, the CPU 301 displays an image captured by the camera 305 on the display unit 306. In step S903, the CPU 301 determines whether an object display position designation request is received from the PC 500. If the CPU 301 determines that an object display position designation request is received from the PC 500 (YES in step S903), the processing proceeds to step S904.

In step S904, the CPU 301 displays a message prompting the user to designate an object display position and displays the position designation object 1002. The position designation object 1002 can be moved using a controller (not illustrated). When a confirm button on the controller is pressed, the object display position is confirmed.

In step S905, the CPU 301 determines whether the object display position is designated by the user. If the CPU 301 determines that the object display position is designated (YES in step S905), the processing proceeds to step S906.

In step S906, the CPU 301 notifies the PC 500 that the object display position has been designated.

In step S907, the CPU 301 determines whether the object to be displayed is received from the PC 500. If the CPU 301 determines that the object to be displayed is received from the PC 500 (YES in step S907), the processing proceeds to step S908.

In step S908, the CPU 301 stores the coordinate information indicating the display position designated by the user into the storage 304. To display the object received from the PC 500 at the display position designated by the user, the CPU 301 performs rendering processing including the size change based on the distance from the user to the display position, and the angle adjustment based on the user's orientation.

In step S909, the CPU 301 displays, on the display unit 306, the object for which the rendering processing is completed at the designated display position in a superimposed manner on the video image captured by the camera 305.

In step S910, the CPU 301 performs the rendering processing based on the change in the user's movement and orientation and displays, on the display unit 306, the object in a superimposed manner on the captured image.

In step S911, the CPU 301 determines whether the setting change object 1101 to be displayed is received from the PC 500. If the CPU 301 determines that the setting change object 1101 is received from the PC 500 (YES in step S911), the processing proceeds to step S912. In step S912, the CPU 301 displays, on the display unit 306, the setting change object 1101 received from the PC 500 in a superimposed manner on the captured image. In step S913, the CPU 301 determines whether the user has made a setting change using the setting change object 1101. If the CPU 301 determines that the user has made a setting change (YES in step S913), the processing proceeds to step S914. If the CPU 301 determines that the user has not made a setting change (NO in step S913), the processing proceeds to step S919.

In step S914, the CPU 301 notifies the PC 500 that a setting change button, such as the size change button 1102 or the size change button 1103, has been pressed.

In step S915, the CPU 301 determines whether the object in which the setting change is reflected is received from the PC 500. If the CPU 301 determines that the object after the setting change is received from the PC 500 (YES in step S915), the processing proceeds to step S916.

In step S916, the CPU 301 performs the rendering processing based on the display position stored in step S908. In step S917, the CPU 301 displays, on the display unit 306, the object for which the rendering processing is completed at the display position stored in step S908 in a superimposed manner on the captured image.

In step S918, the CPU 301 performs the rendering processing based on the change in the user's movement and orientation and displays, on the display unit 306, the object in a superimposed manner on the captured image.

In step S919, the CPU 301 determines whether the confirm button 1104 is pressed. If the CPU 301 determines that the confirm button 1104 is pressed (YES in step S919), the processing proceeds to step S920. If the CPU 301 determines that the confirm button 1104 is not pressed (NO in step S919), the processing proceeds to step S921.

In step S920, the CPU 301 notifies the PC 500 that the confirm button 1104 has been pressed and terminates the processing. In step S921, the CPU 301 determines whether the cancel button 1105 is pressed. If the CPU 301 determines that the cancel button 1105 is pressed (YES in step S921), the processing proceeds to step S922. If the CPU 301 determines that the cancel button 1105 is not pressed (NO in step S921), the processing returns to step S913. In step S922, the CPU 301 notifies the PC 500 that the cancel button 1105 has been pressed and terminates the processing.

The above-described processing makes it possible to reduce a waste of sheets when the user checks a product to be output based on the print settings designated by the user. Further, if it is determined that the result of checking a preview of the product is not the result desired by the user, the user can make a print setting change in the AR space, thereby saving the user time and labor. Furthermore, the preview can be displayed again based on the print setting change made in the AR space, which leads to an increase in convenience.

Figure 12:
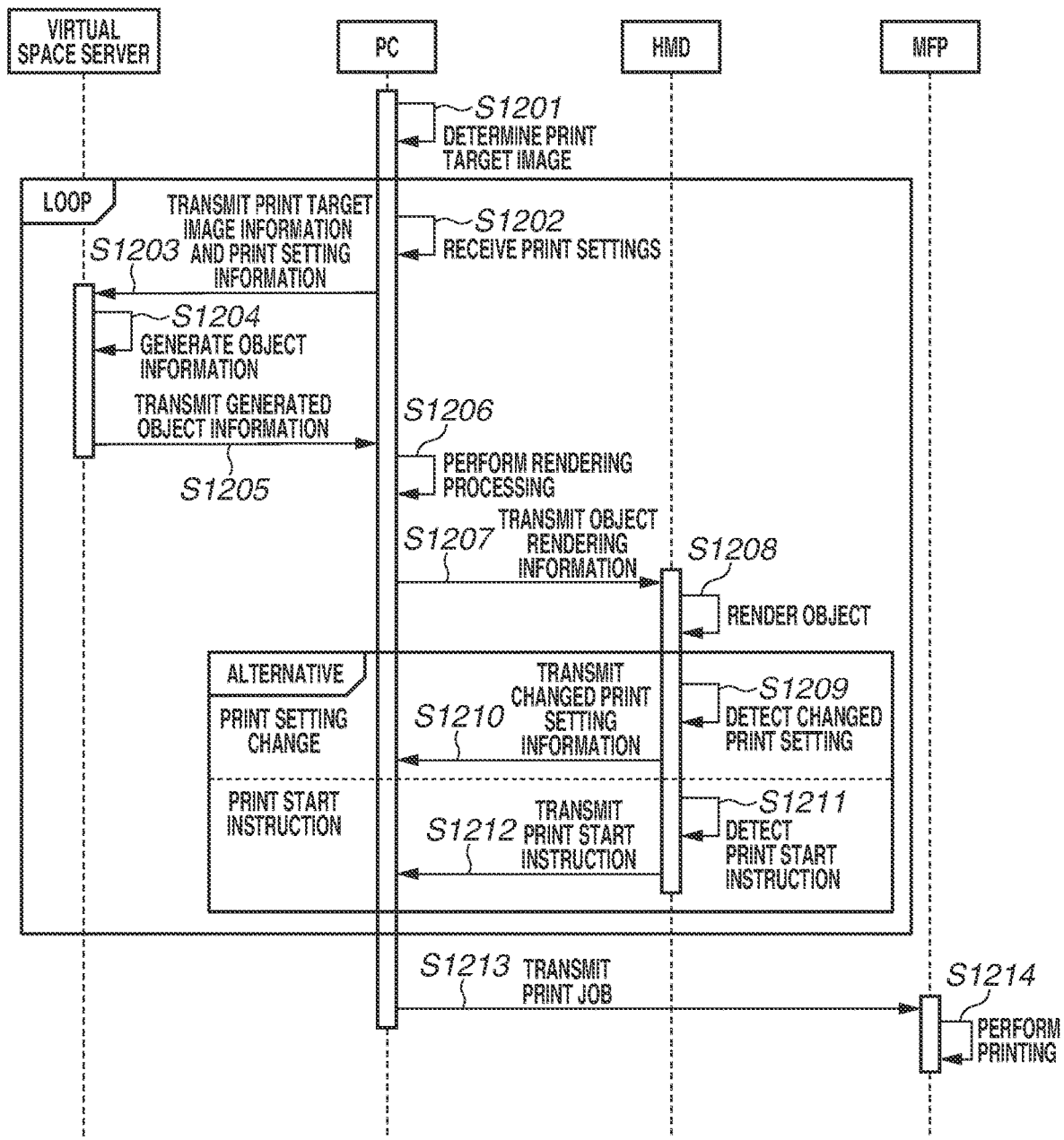
FIG. 12 is a sequence diagram illustrating a virtual reality (VR) bookbinding printing preview function.

A second exemplary embodiment will be described. A VR bookbinding printing preview function will be described below. FIG. 12 is a sequence diagram illustrating the VR bookbinding printing preview function. This sequence is started when the CPU 501 starts a VR bookbinding printing preview app installed on the PC 500.

In step S1201, the CPU 501 of the PC 500 determines a print target image from among the images stored in the HDD 504. The CPU 501 can determine the print target image when the user selects the print target image via the operation unit 506.

In step S1202, the CPU 501 of the PC 500 receives print settings and/or post-processing settings from the user via the operation unit 506. Examples of the print settings described herein include "image position" and "N-in-1". Examples of the post-processing settings include "stapling position adjustment" and "folding method". If Z-fold is set as "folding method", "X-length", "Y-length", and the like are set in advanced settings for Z-fold. Settings such as those described above are received as the print settings for printing the print target image.

In step S1203, the CPU 501 of the PC 500 transmits, to the virtual space server 400, information about the print target image determined in step S1201 and information about the print settings received in step S1202.

In step S1204, the CPU 401 in the virtual space server 400 generates object information to be displayed in the VR space using the print target image information and print setting information received in step S1203. The generated object information corresponds a preview of a product to be output based on the print target image and the print settings.

In step S1205, the CPU 401 in the virtual space server 400 transmits the object information generated in step S1204 to the PC 500.

In step S1206, the CPU 501 of the PC 500 performs rendering processing on the object information received in step S1205 to generate object rendering information. In step S1207, the object rendering information generated by the CPU 501 of the PC 500 is transmitted to the HMD 300.

Figure 15:
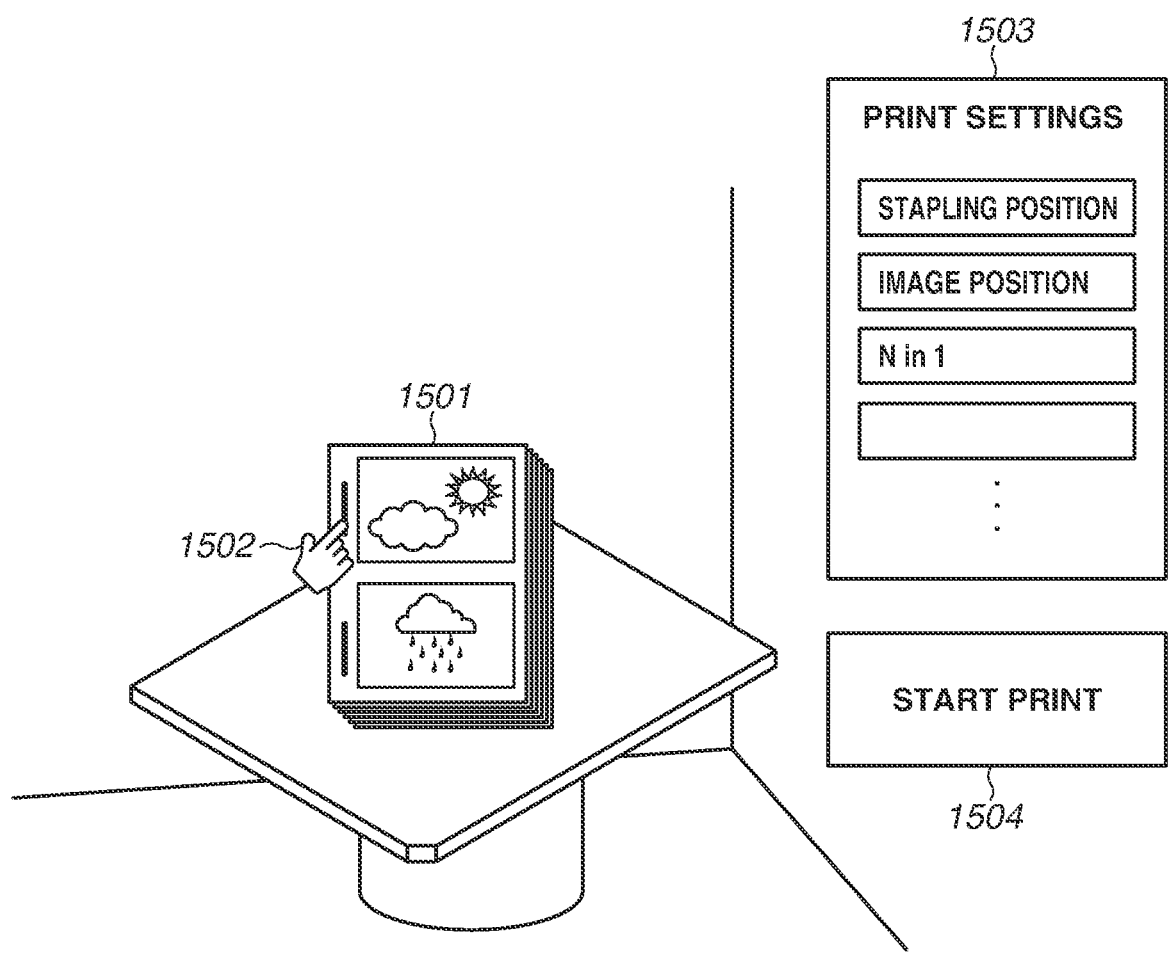
FIG. 15 is a diagram illustrating a state where a three-dimensional (3D) object to which print settings are applied is displayed in a VR space displayed on the HMD.

FIG. 15 illustrates a state where a 3D object 1501 in which various print settings are reflected is displayed in the VR space displayed on the HMD 300.

FIG. 15 illustrates a state immediately after the 3D object 1501 is displayed. The 3D object 1501 displayed in FIG. 15 is rendered in step S1208 based on the object rendering information transmitted in step S1207 during the sequence in FIG. 12. A pointer 1502 can be operated using the sensor 310 to select a desired object in the VR space. Print settings 1503 indicate currently applied print settings and post-processing settings, and various setting changes can be made using the pointer 1502. When a print start button 1504 is pressed, printing is performed based on the currently applied print settings.

Figure 16:
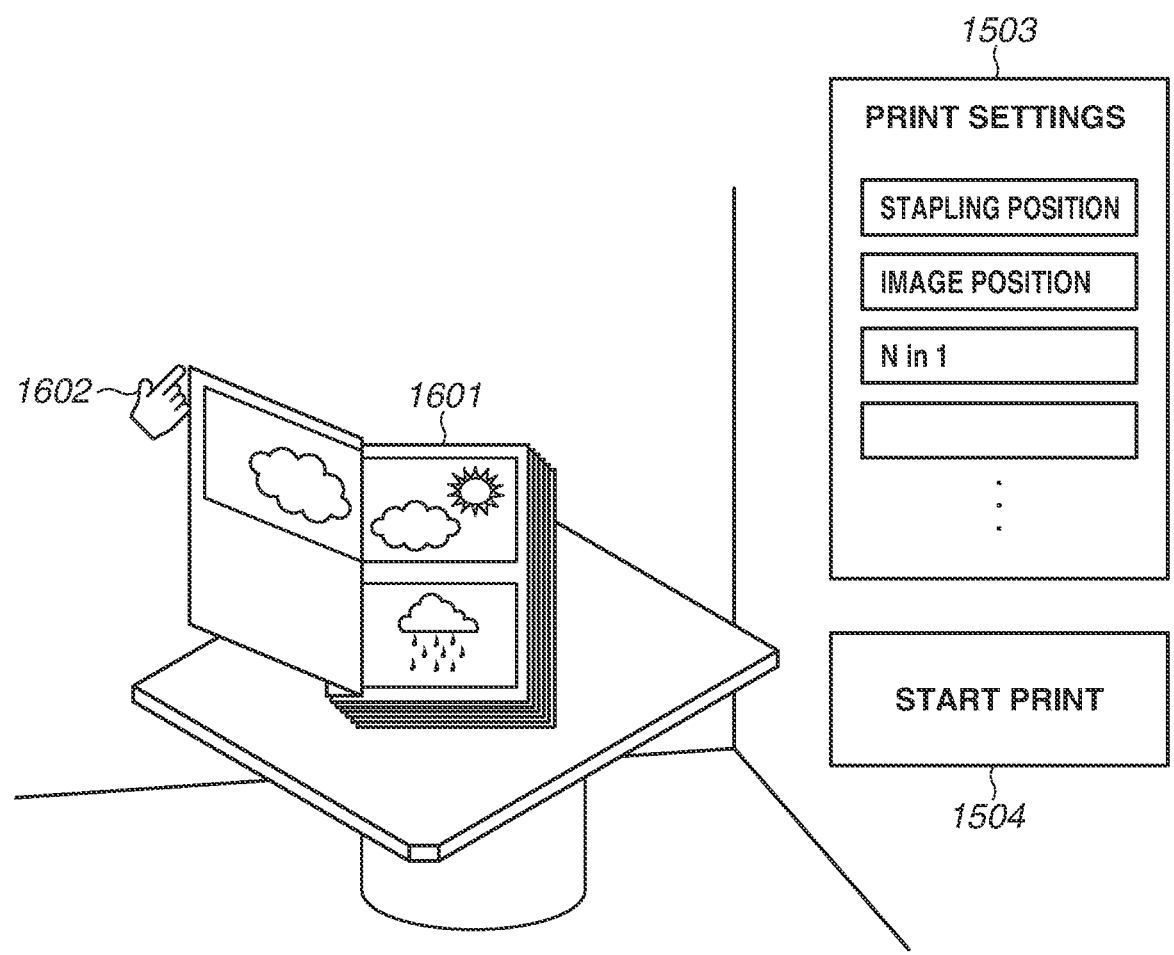
FIG. 16 is a diagram illustrating a preview in a state where one of pages of the 3D object is turned.

With an object displayed in the VR space, an image layout on any of a plurality of pages of an output product to which the print settings and/or the post-processing settings are applied can be previewed. FIG. 16 illustrates a preview in a state where one of pages of a 3D object 1601 is turned. The 3D object 1601 is displayed in the VR space and a pointer 1602 has the same function as that of the pointer 1502. Moving the pointer 1602 while selecting the upper-right portion of the page of the 3D object 1601 using the pointer 1602 makes it possible to render the 3D object 1601 again based on the object rendering information and to change the display as if the page is turned. Since the print settings 1503 and the print start button 1504 are described above with reference to FIG. 15, the descriptions thereof will be omitted.

Figure 17:
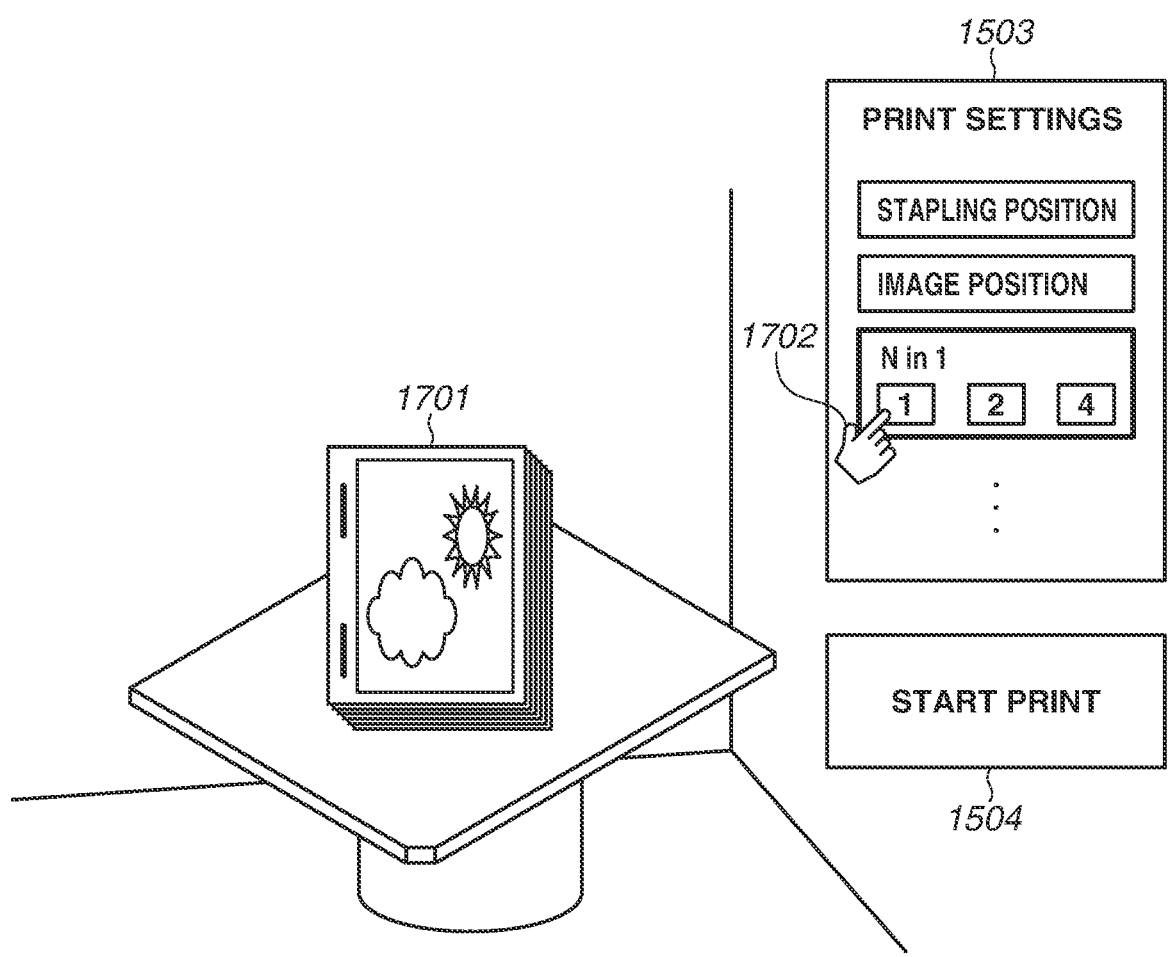
FIG. 17 is a diagram illustrating a state where object rendering is changed due to a layout setting change in the print settings.
Figure 18:
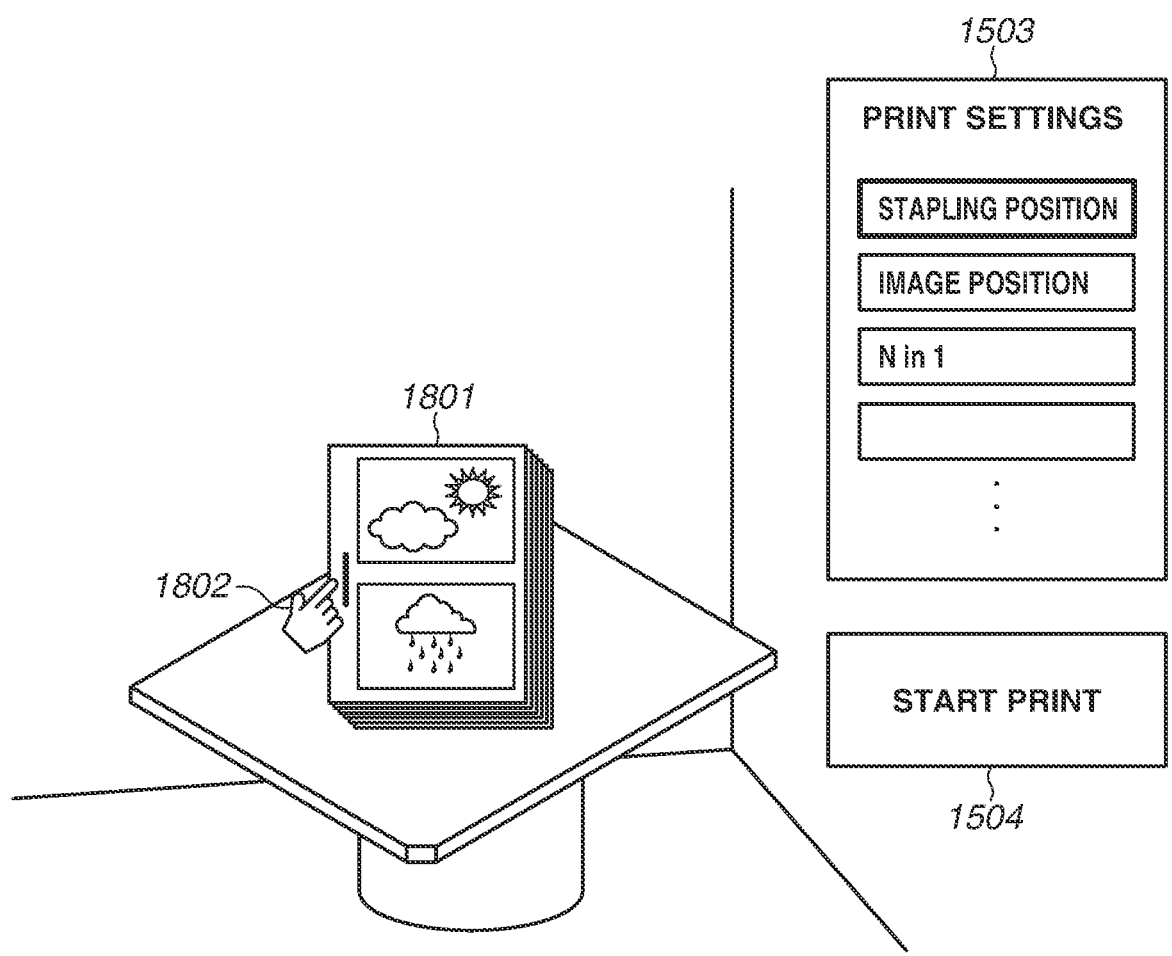
FIG. 18 is a diagram illustrating a state where the object rendering is changed due to a post-processing setting change in the print settings.

The rendering result of the 3D object 1501 can be changed in real time when values in the currently applied print settings 1503 are changed. FIG. 17 illustrates a state where the object rendering is changed when a layout setting in the print settings 1503 is changed. An object 1701 is obtained after the layout setting is changed. A pointer 1702 has the same function as that of the pointer 1502. In the example of FIG. 17, a set value N in "N-in-1" is changed from "2" to "1" by the pointer 1702, and subsequently the 3D object 1501 is changed to the object 1701. FIG. 18 illustrates a state where the object rendering is changed when a post-processing setting in the print settings 1503 is changed. An object 1801 is obtained after the post-processing setting is changed. A pointer 1802 has the same function as that of the pointer 1502. In the example of FIG. 18, "stapling position" is selected and changed using the pointer 1802 from "vertical two positions on the left side of the output product" to "one position at the center on the left side". Subsequently, the 3D object 1501 is changed to the object 1801.

Figure 19:
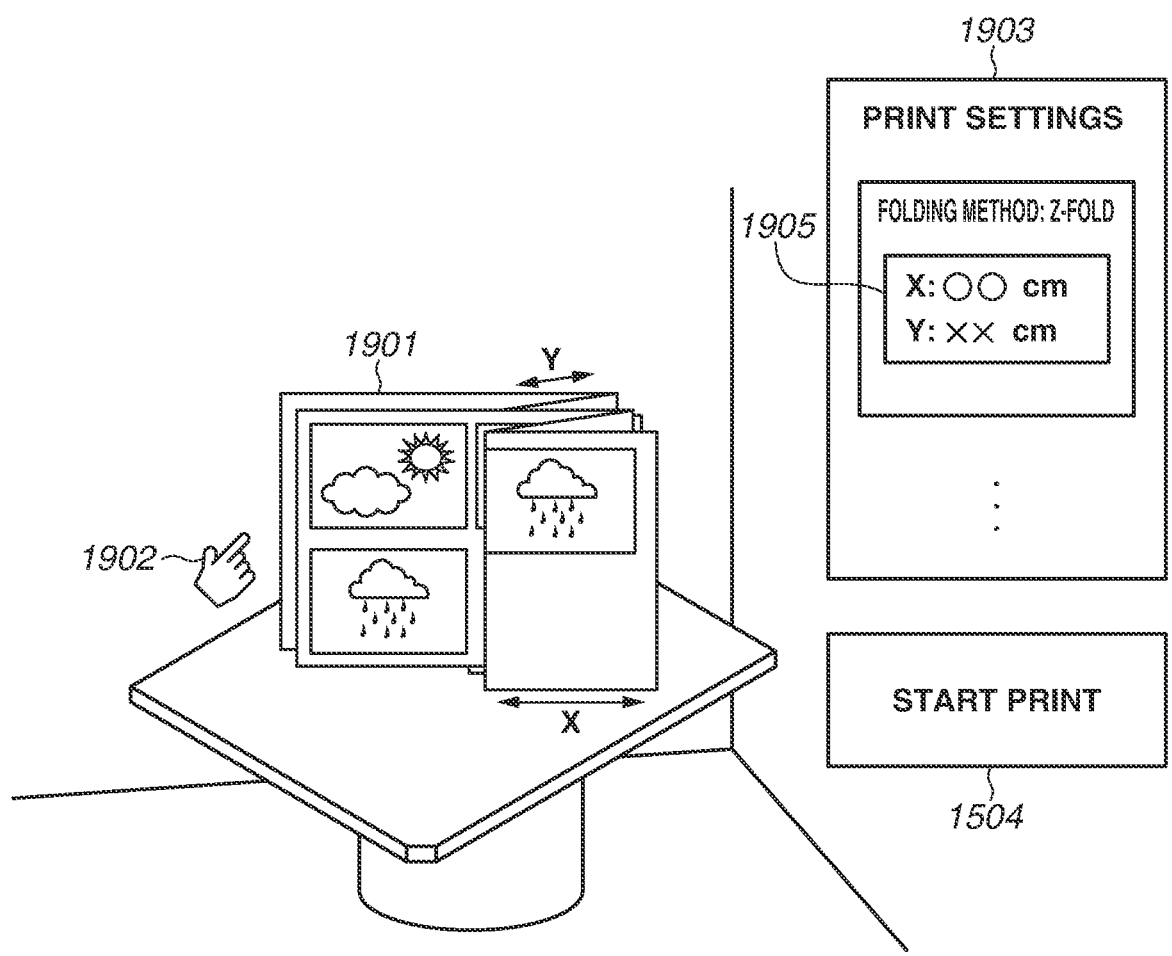
FIG. 19 is a diagram illustrating a state where a 3D object to which print settings are applied is displayed in the VR space displayed on the HMD.

Not only the print settings illustrated in FIG. 15, but also many other print settings are available. Some of the print settings, such as Z-fold setting, use complicated parameters. FIG. 19 illustrates a state where a 3D object 1901 in which various print settings are reflected is displayed in the VR space displayed on the HMD 300. In this example, the 3D object 1901 is displayed in the VR space and Z-fold is applied thereto. A pointer 1902 has the same function as that of the pointer 1502. Like the print settings 1503, print settings 1903 indicate currently applied print settings and post-processing settings. The print settings 1903 also includes a Z-fold parameter item 1905. The Z-fold parameter item 1905 enables input of X-length and Y-length, which are advanced settings for Z-fold, as parameters. The sensor 310 may be used as a parameter input unit, or an object for input (not illustrated) may be displayed in the VR space.

Referring again to FIG. 12, in step S1208, the CPU 301 in the HMD 300 renders the 3D object 1501 in the VR space based on the object rendering information received in step S1207.

At the same time, the print setting information for the 3D object 1501 being previewed as the output product is displayed as the print settings 1503 in the VR space.

Processing in steps S1209 and S1210 is performed when a value in the print settings 1503 is changed in the VR space. In step S1209, the CPU 301 in the HMD 300 detects a changed print setting. In step S1210, the CPU 301 in the HMD 300 transmits information about the changed print setting to the PC 500. The processing then returns to step S1202 to perform the sequence of regenerating the object rendering information.

Steps S1211 and S1212 are performed when the print start button 1504 is pressed in the VR space. In step S1211, the CPU 301 in the HMD 300 detects a print start instruction. In step S1212, the CPU 301 in the HMD 300 transmits the print start instruction to the PC 500. The processing then proceeds to step S1213.

In step S1213, the CPU 501 of the PC 500 transmits print job information generated based on the print target image information and the print setting information to the MFP 200.

In step S1214, the MFP 200 performs printing based on the received print job information.

Figure 13:
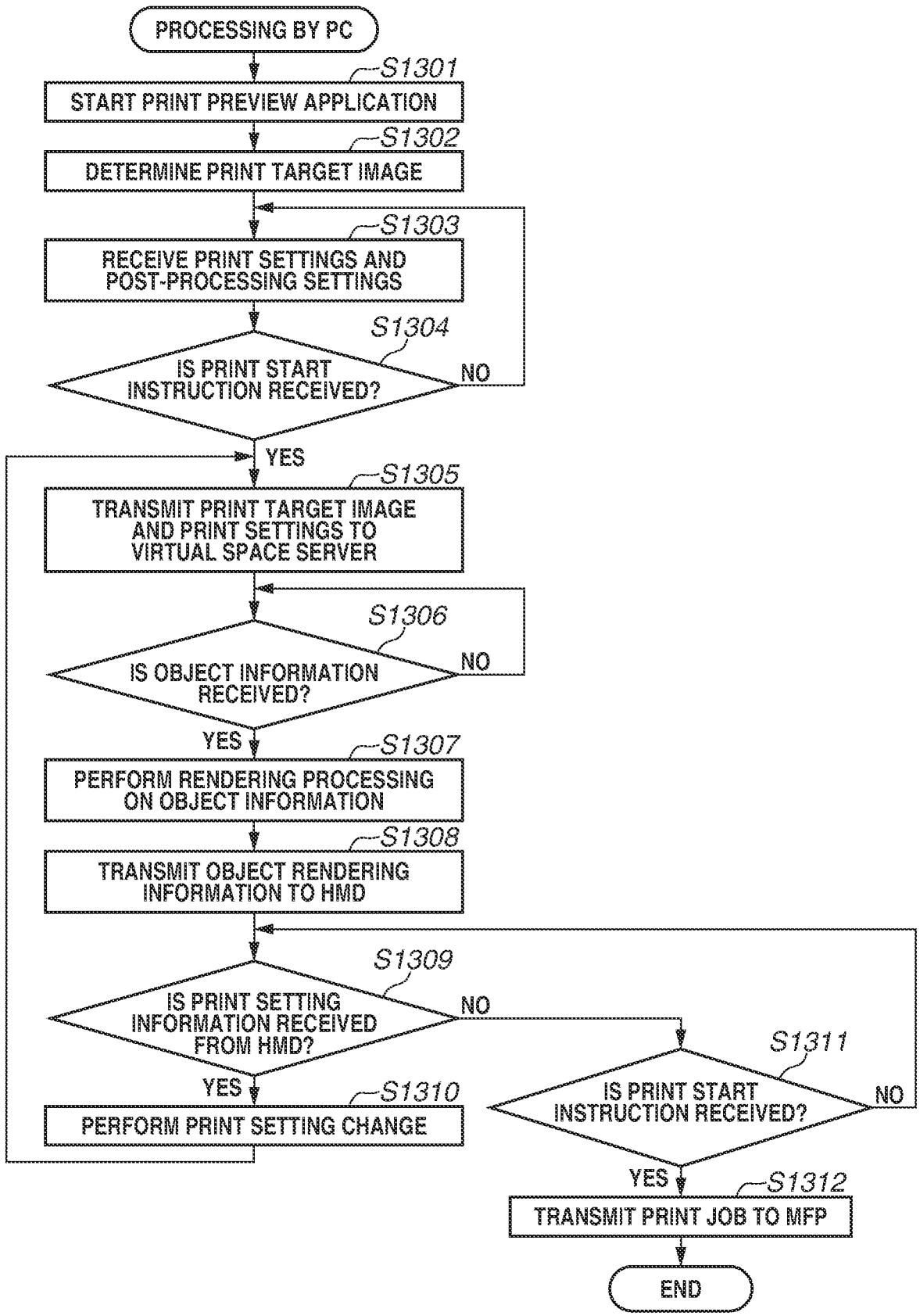
FIG. 13 is a flowchart illustrating an example of processing performed by the PC.

FIG. 13 is a flowchart illustrating an example of processing performed by the PC 500.

In step S1301, the CPU 501 of the PC 500 starts a print preview app.

In step S1302, the CPU 501 of the PC 500 determines a print target image from among the images stored in the HDD 504. The CPU 501 can determine the print target image when the user selects the print target image via the operation unit 506.

In step S1303, the CPU 501 of the PC 500 receives print settings and post-processing settings from the user via the operation unit 506.

In step S1304, the CPU 501 of the PC 500 waits to receive a print start instruction from the user via the operation unit 506. If a print start instruction is not received (NO in step S1304), the processing returns to step S1303. If a print start instruction is received (YES in step S1304), the processing proceeds to step S1305.

In step S1305, the CPU 501 of the PC 500 transmits the print target image determined in step S1302 and the print settings received in step S1303 to the virtual space server 400.

In step S1306, the CPU 501 of the PC 500 determines whether object information is received from the virtual space server 400. If object information is received (YES in step S1306), the processing proceeds to step S1307.

In step S1307, the CPU 501 of the PC 500 performs the rendering processing on the object information to generate object rendering information.

In step S1308, the CPU 501 of the PC 500 transmits the object rendering information generated in step S1307 to the HMD 300.

In step S1309, the CPU 501 of the PC 500 determines whether print setting information is received from the HMD 300. If print setting information is received from the HMD 300 (YES in step S1309), the processing proceeds to step S1310. If print setting information is not received from the HMD 300 (NO in step S1309), the processing proceeds to step S1311.

In step S1310, the CPU 501 of the PC 500 changes the print settings based on the received print setting information. The processing then returns to step S1305 to perform the processing for transmitting the print target image and the print settings to the virtual space server 400 again.

In step S1311, the CPU 501 of the PC 500 determines whether a print start instruction is received. If a print start instruction is received (YES in step S1311), the processing proceeds to step S1312. If a print start instruction is not received (NO in step S1311), the processing returns to step S1309 to wait to receive print setting information.

In step S1312, the CPU 501 of the PC 500 generates print job information based on the print target image and the print settings and transmits the generated print job information to the MFP 200. The processing is then terminated.

Figure 14:
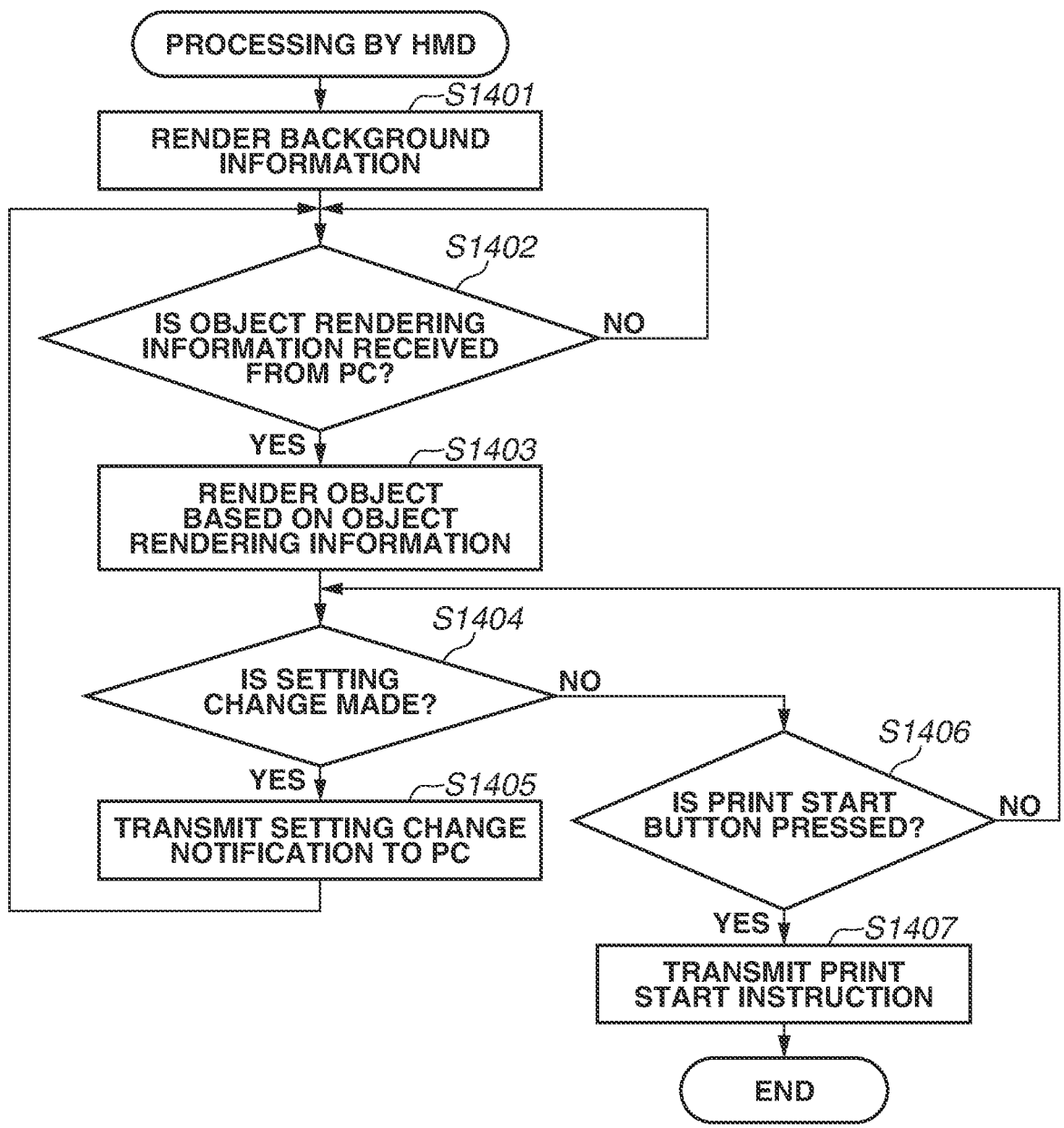
FIG. 14 is a flowchart illustrating an example of processing performed by the HMD.

FIG. 14 is a flowchart illustrating an example of processing performed by the HMD 300. This flowchart is started when a print preview app prepared in the HMD 300 is executed by the CPU 301.

In step S1401, the CPU 301 in the HMD 300 renders background information.

In step S1402, the CPU 301 in the HMD 300 determines whether object rendering information is received from the PC 500. If object rendering information is received from the PC 500 (YES in step S1402), the processing proceeds to step S1403.

In step S1403, the CPU 301 in the HMD 300 generates and renders the 3D object 1501 in the VR space based on the received object rendering information. At the same time, the CPU 301 renders the print settings 1503 in which the print setting information is reflected.

In step S1404, the CPU 301 in the HMD 300 determines whether a value in the print settings 1503 is changed. If a value in the print settings 1503 is changed (YES in step S1404), the processing proceeds to step S1405. If a value in the print settings 1503 is not changed (NO in step S1404), the processing proceeds to step S1406.

In step S1405, the CPU 301 in the HMD 300 notifies the PC 500 of the print setting change. The processing then returns to step S1402 to wait to receive object rendering information to which the print setting change is applied. In step S1406, the CPU 301 in the HMD 300 determines whether the print start button 1504 is pressed. If the print start button 1504 is pressed (YES in step S1406), the processing proceeds to step S1407. If the print start button 1504 is not pressed (NO in step S1406), the processing returns to step S1404. In step S1407, the CPU 301 in the HMD 300 transmits a print start instruction to the PC 500.

The above-described configuration enables the MFP 200 to perform printing after the user checks the 3D object 1501 in which the print settings and the post-processing settings are reflected in the VR space and confirms that the print settings are as intended. If the user wishes to change any of the print settings and the post-processing settings during the preview of the 3D object 1501, the user can change the corresponding value in the print settings 1503, whereby the changed value can be reflected in the 3D object 1501 and the 3D object 1501 can be displayed again.

According to the exemplary embodiments of the present disclosure, it is possible to reduce a waste of sheets in a case where a user checks a product to be output based on print settings designated by the user.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-188908, filed Nov. 28, 2022, which is hereby incorporated by reference herein in its entirety.

What is claimed is:

1. A printing system comprising:
at least one memory storing instructions; and
at least one processor that, upon execution of the stored instructions, operates to:
receive image data designated by a user;
receive, from the user, sheet size information indicating a size of a sheet where the received image data is to be printed;
generate a virtual object based on the received sheet size information and the received image data;
display the generated virtual object in a superimposed manner on a video image obtained by image capturing; and
transmit the received sheet size information and the received image data to a printing apparatus and cause the printing apparatus to perform printing, based on the received sheet size information, the received image data on the sheet,
wherein the virtual object is displayed, in actual size, based on the video image and the received sheet size information.

2. The printing system according to claim 1, wherein the at least one processor further operates to:
change the received sheet size information based on an instruction issued by the user in a state where the virtual object is displayed,
wherein another virtual object is generated based on the changed sheet size information, and the other virtual object is displayed in a superimposed manner on the video image.

3. The printing system according to claim 2, wherein the at least one processor changes the received sheet size information based on capability information indicating capabilities of the printing apparatus.

4. The printing system according to claim 1, wherein the at least one processor further operates to:
perform the image capturing to obtain the video image; and
receive designation of a position,
wherein the the at least one processor displays the virtual object based on the position and the video image obtained by the image capturing.

5. The printing system according to claim 4, wherein the at least one processor displays the virtual object in actual size based on distance information calculated based on the position and the video image obtained by the image capturing.

6. The printing system according to claim 1, wherein upon receiving a print instruction from the user in a state where the virtual object is displayed, the at least one processor transmits the received sheet size information and the received image data to the printing apparatus and causes the printing apparatus to perform the printing, based on the received sheet size information, the received image data on the sheet.

7. The printing system according to claim 1, wherein the at least one processor displays the virtual object in an augmented reality (AR) space.

8. A terminal apparatus comprising:
a controller that displays a virtual object in a superimposed manner on a video image obtained by image capturing, the virtual object being generated based on sheet size information indicating a size of a sheet where received image data is to be printed and the received image data; and
a communicator that transmits the received sheet size information and the received image data to a printing apparatus and cause the printing apparatus to perform printing, based on the received sheet size information, the received image data on the sheet, wherein the controller displays the virtual object, in actual size, based on the video image and the received sheet size information.

9. A non-transitory computer-readable storage medium storing a program for causing a computer to execute a method comprising:

displaying a virtual object in a superimposed manner on a video image obtained by image capturing, the virtual object being generated based on sheet size information indicating a size of a sheet where received image data is to be printed and the received image data; and transmitting the received sheet size information and the received image data to a printing apparatus and causing the printing apparatus to perform printing, based on the received sheet size information, the received image data on the sheet, wherein the virtual object is displayed, in actual size, based on the video image and the received sheet size information.

* * * * *